(12) United States Patent
Furxhi et al.

(10) Patent No.: US 8,508,592 B2
(45) Date of Patent: Aug. 13, 2013

(54) SPATIALLY-SELECTIVE REFLECTOR STRUCTURES, REFLECTOR DISKS, AND SYSTEMS AND METHODS FOR USE THEREOF

(75) Inventors: Orges Furxhi, Memphis, TN (US);
Eddie L. Jacobs, Memphis, TN (US);
Thomas Layton, Memphis, TN (US)

(73) Assignee: The University of Memphis Research Foundation, Memphis, TN (US)

( * ) Notice: Subject to any disclaimer, the term of this patent is extended or adjusted under 35 U.S.C. 154(b) by 448 days.

(21) Appl. No.: 12/713,049

(22) Filed: Feb. 25, 2010

(65) Prior Publication Data

US 2010/0253783 A1    Oct. 7, 2010

Related U.S. Application Data

(60) Provisional application No. 61/155,316, filed on Feb. 25, 2009, provisional application No. 61/301,433, filed on Feb. 4, 2010.

(51) Int. Cl.
*H04N 9/47* (2006.01)
(52) U.S. Cl.
USPC ............................................. 348/143; 372/14
(58) Field of Classification Search
USPC .......................................... 348/143; 372/14
See application file for complete search history.

(56) References Cited

U.S. PATENT DOCUMENTS

| | | | |
|---|---|---|---|
| 2,880,355 A | 3/1959 | Epsztein | |
| 4,019,053 A | 4/1977 | Levine | |
| 4,531,076 A | 7/1985 | Holder | |
| 4,802,748 A | 2/1989 | McCarthy | |
| 4,917,478 A | 4/1990 | Petran et al. | |
| 5,067,805 A | 11/1991 | Corle et al. | |
| 5,202,692 A | 4/1993 | Huguenin et al. | |
| 5,587,832 A | 12/1996 | Krause | |

(Continued)

FOREIGN PATENT DOCUMENTS

JP    2008-241352    10/2008

OTHER PUBLICATIONS

Harold Jacobs, 'A Bulk Semiconductor Imaging Device for Millimeter and Submillimeter Radiation', May 5, 1969, Edition 16, vol. #5, pp. 419-424.*

(Continued)

*Primary Examiner* — Kamal B Divecha
*Assistant Examiner* — Glenford Madamba
(74) *Attorney, Agent, or Firm* — Edwards Wildman Palmer LLP; Peter F. Corless; Brian R. Landry

(57) ABSTRACT

The invention provides a spatially-selective reflective structure for the detection of submillimeter electromagnetic waves and systems and methods incorporating spatially-selective reflective structures. One aspect of the invention provides a spatially-selective reflective structure including a partially-conducting slab and a modulating reflector disk adjacent to the partially-conducting slab. The modulating reflector disk includes a plurality of modulations. Another aspect of the invention provides a submillimeter imaging device including submillimeter wave optics, a spatially-selective reflective structure located in the focal plane of the submillimeter wave optics, a submillimeter wave receiver positioned to capture waves reflected from the spatially-selective reflective structure, and a motor configured to rotate the spatially-selective reflective structure. The spatially-selective reflective structure includes a partially-conducting slab and a modulating reflector disk adjacent to the partially-conducting slab. The modulating reflector plate includes one or more modulations.

23 Claims, 31 Drawing Sheets

(56) References Cited

U.S. PATENT DOCUMENTS

| | | | |
|---|---|---|---|
| 5,642,394 | A | 6/1997 | Rothschild |
| 5,663,639 | A | 9/1997 | Brown |
| 5,666,441 | A | 9/1997 | Rao et al. |
| 5,789,750 | A | 8/1998 | Nuss |
| 5,867,251 | A | 2/1999 | Webb |
| 5,923,466 | A | 7/1999 | Krause et al. |
| 6,144,679 | A | 11/2000 | Herman et al. |
| 6,359,582 | B1 | 3/2002 | MacAleese et al. |
| 6,469,624 | B1 | 10/2002 | Whan et al. |
| 6,587,246 | B1 | 7/2003 | Anderton et al. |
| 6,815,683 | B2 | 11/2004 | Federici et al. |
| 6,816,647 | B1 | 11/2004 | Rudd |
| 7,105,820 | B2 | 9/2006 | Federici et al. |
| 7,113,534 | B2 | 9/2006 | Unterrainer et al. |
| 7,152,007 | B2 | 12/2006 | Arnone et al. |
| 7,174,037 | B2 | 2/2007 | Arnone et al. |
| 7,310,442 | B2 | 12/2007 | Monachino et al. |
| 7,326,930 | B2 | 2/2008 | Crawely |
| 7,342,230 | B2 | 3/2008 | Adamski |
| 7,345,279 | B2 | 3/2008 | Mueller |
| 7,359,418 | B2 | 4/2008 | Edamura et al. |
| 7,386,024 | B2 | 6/2008 | Sekiguchi et al. |
| 7,417,440 | B2 | 8/2008 | Peschmann et al. |
| 7,439,511 | B2 | 10/2008 | Demers |
| 7,449,695 | B2 | 11/2008 | Zimdars |
| 2004/0022436 | A1 | 2/2004 | Patti et al. |
| 2004/0065831 | A1 | 4/2004 | Federici et al. |
| 2005/0058242 | A1 | 3/2005 | Peschmann |
| 2005/0117700 | A1 | 6/2005 | Peschmann |
| 2005/0156110 | A1 | 7/2005 | Crawely |
| 2005/0242287 | A1 | 11/2005 | Hakimi |
| 2006/0054824 | A1 | 3/2006 | Federici et al. |
| 2006/0214107 | A1 | 9/2006 | Mueller |
| 2006/0257005 | A1 | 11/2006 | Bergeron et al. |
| 2007/0058037 | A1 | 3/2007 | Bergeron et al. |
| 2007/0228280 | A1 | 10/2007 | Mueller |
| 2007/0229937 | A1 | 10/2007 | Josef Moeller |
| 2007/0235652 | A1 | 10/2007 | Smith |
| 2007/0257194 | A1 | 11/2007 | Mueller |
| 2007/0263226 | A1 | 11/2007 | Kurtz et al. |
| 2008/0002744 | A1 | 1/2008 | Korenblit |
| 2008/0062262 | A1 | 3/2008 | Perron et al. |
| 2008/0069164 | A1 | 3/2008 | Edamura et al. |
| 2008/0159342 | A1 | 7/2008 | McCaughan |
| 2008/0179527 | A1 | 7/2008 | Demers |
| 2008/0211713 | A1 | 9/2008 | Jeck |
| 2008/0212742 | A1 | 9/2008 | Hughes |
| 2008/0217536 | A1 | 9/2008 | Sekiguchi |
| 2008/0219308 | A1 | 9/2008 | Yamanishi et al. |
| 2009/0140961 | A1* | 6/2009 | Geisow et al. ............... 345/84 |
| 2009/0246707 | A1* | 10/2009 | Li et al. ..................... 430/314 |

OTHER PUBLICATIONS

Picometrix, "T-Ray 2000: Research Application Development," http://picomeric.com/pico_products/terahertz_research.asp (Nov. 25, 2008).

Picometrix, "T-Ray 4000: From the Lab to the Shop Floor," http://picometric.com/pico_products/terahertz_tr4000.asp (Nov. 25, 2008).

Coherent, "SIFIR-50" (2007).

Picometrix, "T-Ray 4000 TD-THz System" (2007).

BBC News, "Camera 'looks' through clothing," http://newsvote.bbc.co.uk/mpappa/pagetools/print/ners.bbc.co.uk/1/h . . . (Nov. 25, 2008).

ThruVision, Press Release, "TruVision Introduces T5000 Security Imaging System to 'see' concealed items under clothing at extended ranges outdoors," (Mar. 7, 2008).

ThruVision, "Thruvision—T5000," http://www.thruvision.com/t5000.html (Nov. 25, 2008).

Mohamed-Adel Slamani et al., "Image Processing Tooldsfor the Enhancement of Concealed Weapon Detection," 3 Proc. Int'l Conf. on Image Processing 518-212 (Oct. 1999).

Walter Barbirato et al., "Fracarro, from the Disk of Nipkow to the Digital Convergence," in HISTELCON-08 96-101 (2008).

Harold Jacobs et al., "A Bulk Semiconductor Imaging Device for Millimeter & Submillimeter Radiation," ED-16(5) IEEE Trans. on Electron Devices 419-24 (May 1969).

Chris Tillery, "Detecting Concealed Weapons: Directions for the Future," 258 NIJ Journal 26-28 (2007).

Orges Furxhi & Eddie Jacobs, "Analysis of a device for single pixel terahertz imaging," 6949 Proc. SPIE (Apr. 15, 2008).

Orges Furxhi & Eddie L. Jacobs, "Design and analysis of a spatially selective mirror for submillimeter-wave imaging," 7309 Proc. SPIE (Apr. 29, 2009).

International Search Report, International Application No. PCT/US2010/025426 (Aug. 20, 2010).

Written Opinion of the International Searching Authority, International Application No. PCT/US2010/025426 (Aug. 20, 2010).

David K. Cheng, "Field and Wave Electromagnetics" § 8-7 (2d ed. 1989).

\* cited by examiner

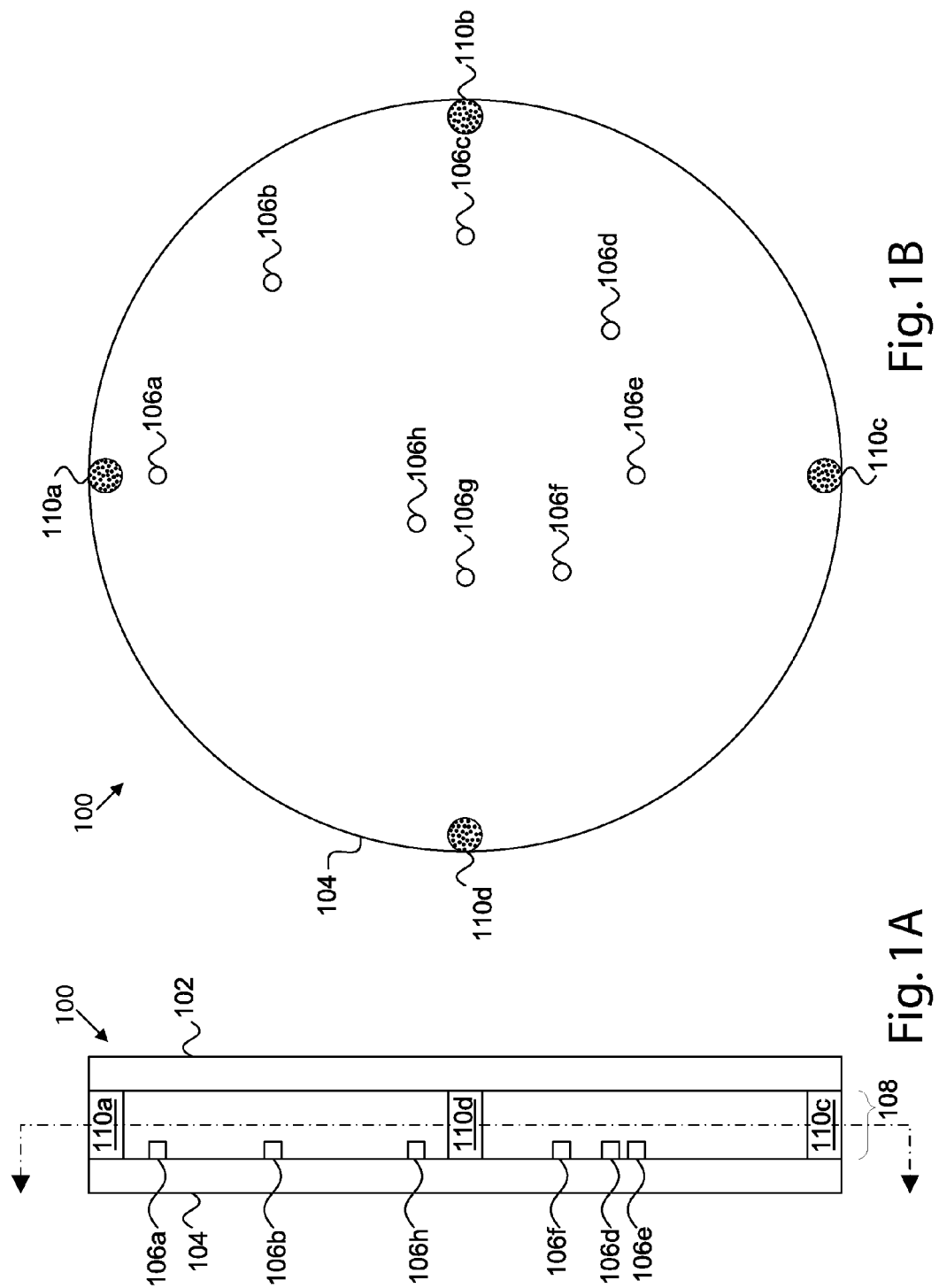

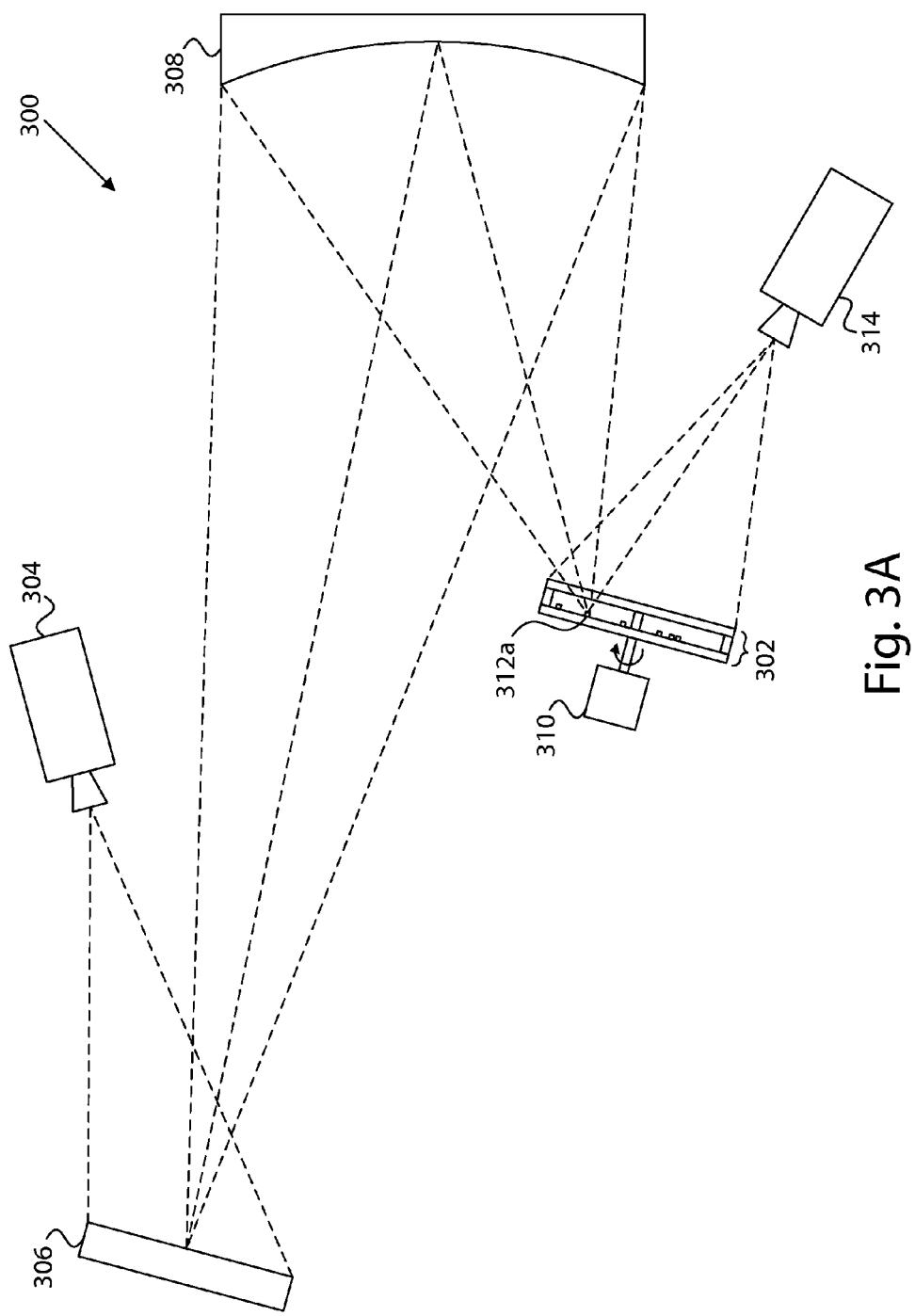

SPATIALLY-SELECTIVE REFLECTOR STRUCTURES, REFLECTOR DISKS, AND SYSTEMS AND METHODS FOR USE THEREOF

CROSS-REFERENCES TO RELATED APPLICATION

This application claims priority to U.S. Provisional Patent Application Ser. No. 61/155,316, filed Feb. 25, 2009, and U.S. Provisional Patent Application Ser. No. 61/301,433, filed Feb. 4, 2010. The contents of these patent applications are hereby incorporated by reference in their entirety.

BACKGROUND

Terrorist attacks over the last decade have heightened security requirements at a host of locations and activities such as airports, sporting events, political gatherings, and the like. Security stations at these locations must process large numbers of individuals in an efficient manner while providing effective screening for weapons and contraband.

Screening for concealed weapons is a particularly challenging task. Many individuals have a variety of metallic items in or on their person (e.g. prostheses, jewelry, belt buckles, coins), thereby impairing the effectiveness of conventional metal detectors. Moreover, weapons can be fabricated from non-metallic materials that cannot be detected with conventional metal detectors. Backscatter X-ray devices exist for detecting such concealed devices, but require that an individual stand close to a flat panel and raise health concerns due to ionizing radiation exposure.

Accordingly, it would be desirable to provide a device that provides improved-resolution imaging of concealed objects without the need for ionizing radiation.

SUMMARY OF THE INVENTION

The invention provides a spatially-selective reflective structure for the detection of submillimeter electromagnetic waves and systems and methods incorporating spatially-selective reflective structures.

One aspect of the invention provides a spatially-selective reflective structure including a partially-conducting slab and a modulating reflector disk adjacent to the partially-conducting slab. The modulating reflector disk includes one or more modulations.

This aspect of the invention can have several embodiments. The one or more modulations can be a single modulation. The one or more modulations can be a plurality of modulations. The plurality of modulations can be arranged in a spiral pattern. The plurality of modulations can be arranged randomly.

The plurality of modulations can be arranged such that a matrix having a plurality of rows, each with elements corresponding to a fraction of each pixel in a viewing window projected onto the disk that is backed by a modulation at a distinct rotational position of the disk, has linearly independent rows.

The plurality of modulations can be separated by a multiple of a wavelength of interest. The multiple can be an odd multiple. The multiple can be greater than five.

The modulations can have well-defined edges. The partially-conducting slab can be a semiconductor. The partially-conducting slab can be a dielectric doped with conductive particles. The partially-conducting slab can include a non-conductive plate and a thin metal film applied to the non-conductive plate.

The modulating reflector disk can include a highly-conductive metal. The partially-conducting slab and the modulating reflector disk can be coupled with one or more mechanical fasteners. The modulating reflector disk can rotate independently of the partially-conducting slab.

The partially-conducting slab and the modulating reflector disk can be separated by a gap. The gap can be adjustable. The modulations can be depressions or bumps.

The modulations can have a cross-sectional dimension greater or equal to about one wavelength of interest. The one or more modulations can have a cross-sectional dimension greater or equal to three wavelengths of interest. The one or more modulations can have a cross-sectional dimension less than the wavelength of interest multiplied by an F-number for an optics system directing radiation at the spatially-selective reflective structure.

The distance between the modulations of the modulating reflector disk and the partially-conducting slab can be defined by the formula $$d_n = n \frac{\lambda}{2\sqrt{\varepsilon_r} \cos(\phi_i)},$$

n=1, 2, ..., wherein $\varepsilon_r$ is the relative permittivity of the media between the partially-conducting slab and the modulations, $\lambda$ is the wavelength of interest, and $\phi_i$ is the angle of radiation incidence given with respect to a normal of the spatially-selective reflective structure.

The distance between a non-modulated surface of the modulating reflector disk and the partially-conducting slab can be defined by the formula $$d_r = \frac{(2n-1)\lambda}{4\sqrt{\varepsilon_r} \cos(\phi_i)},$$

n=1, 2, ... wherein $\varepsilon_r$ is the relative permittivity of the media between the partially-conducting slab and the modulations, $\lambda$ is the wavelength of interest, and $\phi_i$ is the angle of radiation incidence given with respect to a normal of the spatially-selective reflective structure.

Another aspect of the invention provides a submillimeter imaging device including submillimeter wave optics, a spatially-selective reflective structure located in the focal plane of the submillimeter wave optics, a submillimeter wave receiver positioned to capture waves reflected from the spatially-selective reflective structure, and a motor configured to rotate the spatially-selective reflective structure. The spatially-selective reflective structure includes a partially-conducting slab and a modulating reflector disk adjacent to the partially-conducting slab. The modulating reflector plate includes one or more modulations.

This aspect of the invention can have several embodiments. The device can further include a submillimeter wave source. The spatially-selective reflective structure can be positioned to selectively reflect submillimeter waves from an image formed on the spatially-selective reflective structure by the submillimeter wave optics to the submillimeter wave receiver. The submillimeter wave optics can include a focusing mirror. The motor can rotate the spatially-selective reflective structure at about 1,800 revolutions per minute. The receiver can capture images at a rate of about 30 frames per second.

The plurality of modulations can be arranged in a spiral pattern. The plurality of modulations can be arranged in randomly. The plurality of modulations can be arranged such that a matrix having a plurality rows, each with elements corresponding to a fraction of each pixel in a viewing window projected onto the disk that is backed by a modulation at a distinct rotational position of the disk, has linearly independent rows. The submillimeter imaging device can include a shield defining a viewing window on the spatially-selective reflective structure Another aspect of the invention provides a method of submillimeter imaging. The method includes providing submillimeter wave optics, a spatially-selective reflective structure located in the focal plane of the submillimeter wave optics, a submillimeter wave receiver positioned to capture waves reflected from the spatially-selective reflective structure, and a motor configured to rotate the spatially-selective reflective structure; actuating the motor to rotate the spatially-selective reflective structure; capturing a plurality of reflections from the plurality of modulations as the spatially-selective reflective structure rotates; storing each of the plurality of reflections as a pixel; and forming an image from the plurality of the pixels. The spatially-selective reflective structure includes a partially-conducting slab and a modulating reflector disk adjacent to the partially-conducting slab. The modulating reflector plate includes a plurality of modulations.

This aspect of the invention can have several embodiments. The method can include storing the image, displaying the image, and/or performing an image recognition method on the image. The storing and forming steps can be performed on a computer.

Another aspect of the invention provides a method of submillimeter imaging. The method includes: providing submillimeter wave optics, a spatially-selective reflective structure located in the focal plane of the submillimeter wave optics, a submillimeter wave receiver positioned to capture waves reflected from the spatially-selective reflective structure, and a motor configured to rotate the spatially-selective reflective structure; actuating the motor to rotate the spatially-selective reflective structure; capturing a plurality of reflections from the plurality of modulations as the spatially-selective reflective structure rotates; solving a system of equations wherein a magnitude of one of the plurality of reflections is equal to a sum of a product of the reflection in each of a plurality of pixels and the fraction of pixel area backed by the plurality of modulations; and forming an image from the plurality of the pixels. The spatially-selective reflective structure includes a partially-conducting slab and a modulating reflector disk adjacent to the partially-conducting slab. The modulating reflector plate includes a plurality of modulations.

This aspect of the invention can have several embodiments. The number of equations in the system of equations can be equal to the number reflections captured. The plurality of modulations can be arranged such that a matrix having a plurality rows, each with elements corresponding to a fraction of each pixel in a viewing window projected onto the disk that is backed by a modulation at a distinct rotational position of the disk, has linearly independent rows. The solving and forming steps can be performed on a computer.

Another aspect of the invention provides a reflector disk including a metal disk having one or more modulations, a dielectric coupled to the metal disk, and a metal film coupled to the dielectric.

Another aspect of the invention provides a method of fabricating a reflector disk. The method includes applying a dielectric to a metal disk having one or more modulations and applying a metal film to the dielectric.

This aspect of the invention can have a variety of embodiments. The method can include forming the one or more modulations. The method can include machining the dielectric to produce uniform surface prior to applying the metal film.

Another aspect of the invention provides a profiling scanner including a proximal end, a distal end, a first submillimeter imaging device, and a second submillimeter imaging device. The first submillimeter imaging device includes: a first spatially-selective reflective structure, a first submillimeter wave receiver positioned to capture waves reflected from the first spatially-selective reflective structure, and a first motor configured to rotate the first spatially-selective reflective structure. The first spatially-selective reflective structure includes a first partially-conducting slab and a first modulating reflector disk adjacent to the first partially-conducting slab. The first modulating reflector plate includes one or more modulations. The second submillimeter imaging device includes: a second spatially-selective reflective structure, a second submillimeter wave receiver positioned to capture waves reflected from the second spatially-selective reflective structure, and a second motor configured to rotate the second spatially-selective reflective structure. The second spatially-selective reflective structure includes a second partially-conducting slab and a second modulating reflector disk adjacent to the second partially-conducting slab. The second modulating reflector plate includes one or more modulations.

This aspect of the invention can have a variety of the embodiments. In one embodiment, the profiling scanner includes a moving walkway configured to carry an individual from the proximal end to the distal end.

FIGURES

For a fuller understanding of the nature and desired objects of the present invention, reference is made to the following detailed description taken in conjunction with the accompanying drawing figures wherein:

FIGS. 1A and 1B depict a side view and a cross-sectional view, respectively, of a spatially-selective reflective structure according to one embodiment of the invention.

FIG. 3A depicts an imaging system incorporating a spatially-selective reflective structure according to one embodiment of the invention.

respectively, the sheet resistivity is 377Ω/□, and the radiation is normally incident to the structure according various embodiments of the invention.

Figure 14A:
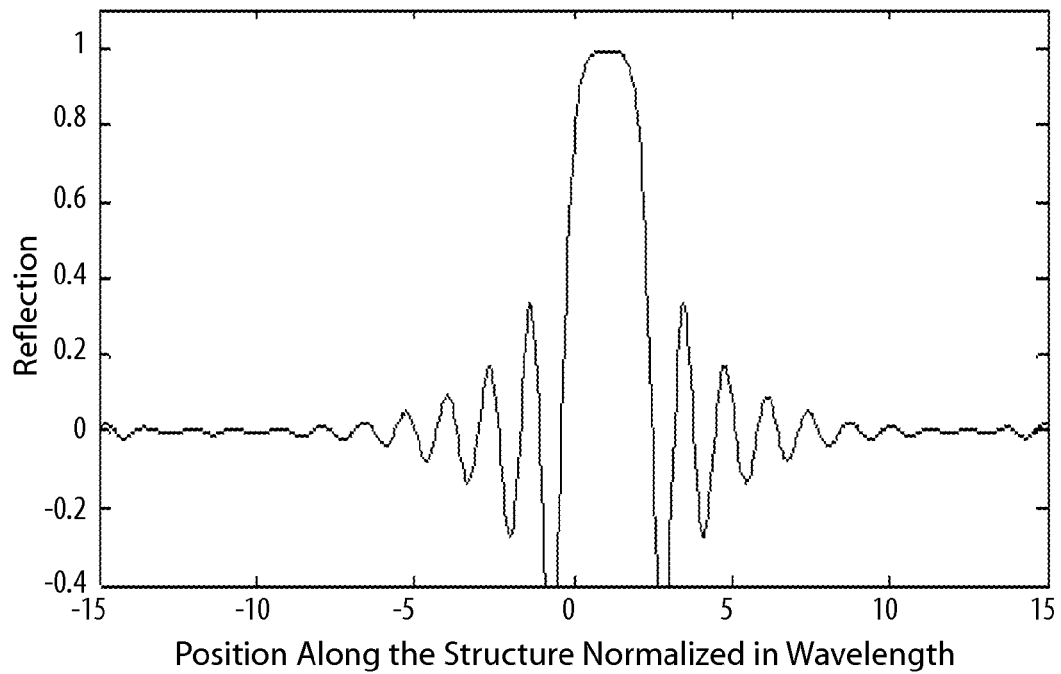
Figure 14B:
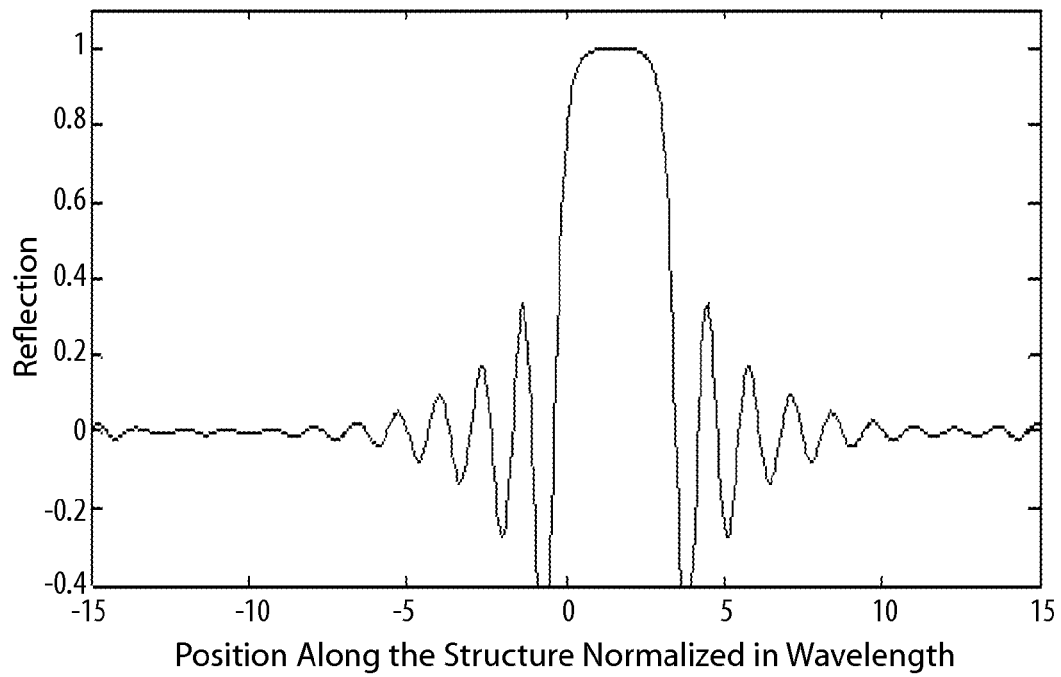
Figure 15:
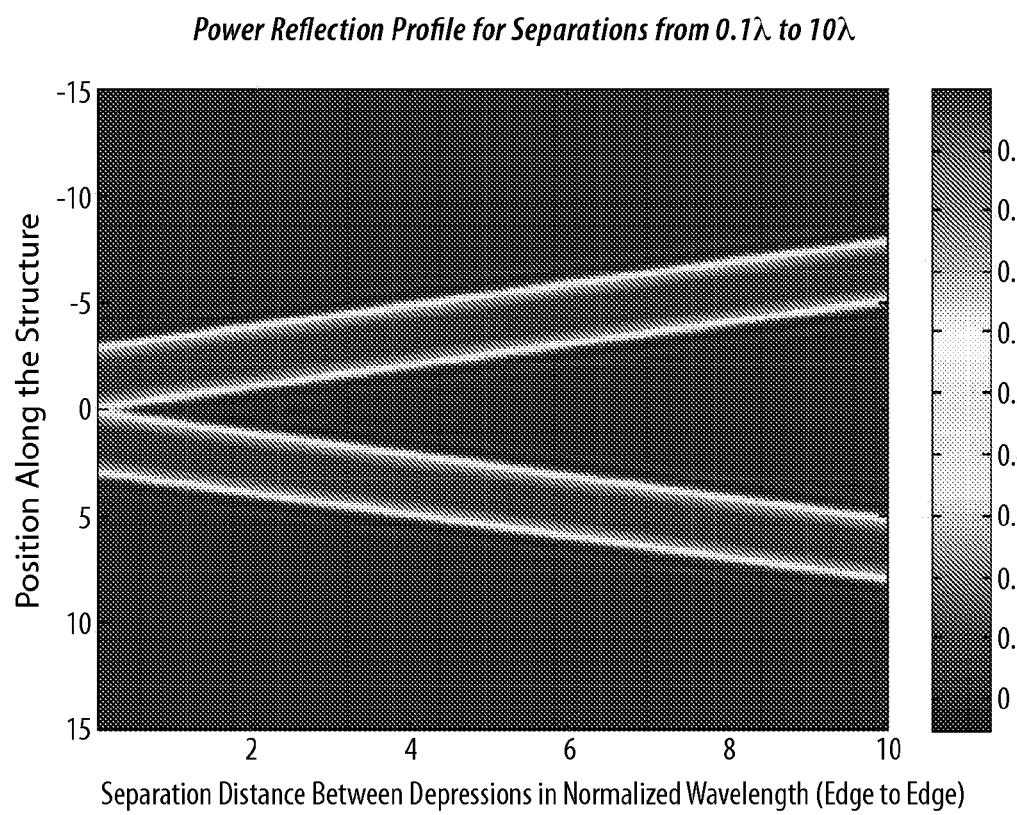
Figure 16A:
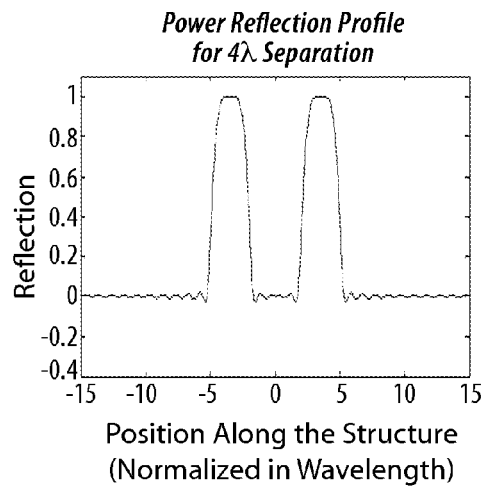
Figure 16B:
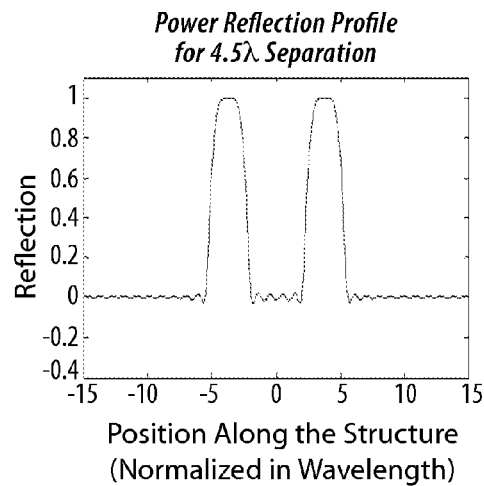
Figure 16C:
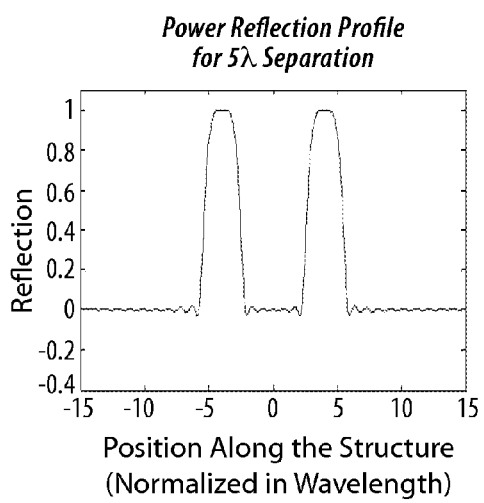
Figure 16D:
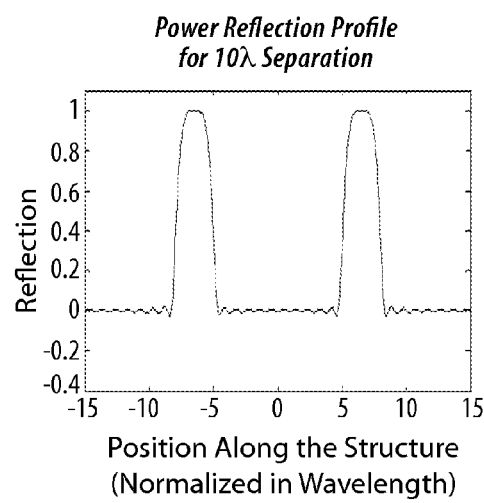

FIGS. 14A and 14B depict the power reflection profile of a spatially-selective reflective structure having a bump distance and reflector distance of $$\frac{\lambda}{2} \text{ and } \frac{3\lambda}{4},$$

respectively, a sheet resistivity of 377Ω/□, and radiation normally incident to the structure according to various embodiments of the invention FIG. 15 depicts the power reflection coefficient for a structure that is modulated by two depressions separated by a gap that varies from 0.1λ to 10λ according to various embodiments of the invention.

FIGS. 16A, 16B, 16C, and 16D depict slices of FIG. 15 and provide reflectivity profiles for separations of 4λ, 4.5λ, 5λ, and 10λ, respectively, according to various embodiments of the invention.

Figure 17:
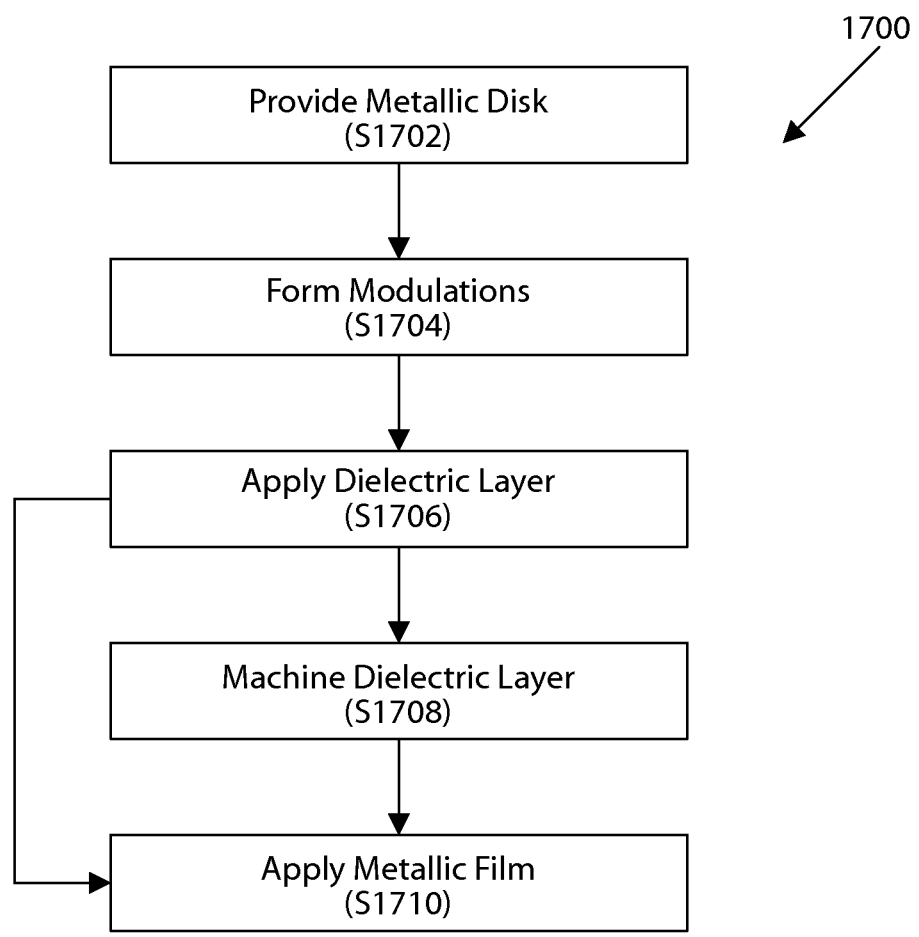

FIG. 17 depicts a method of fabricating a reflector disk according to one embodiment of the invention.

Figure 18:
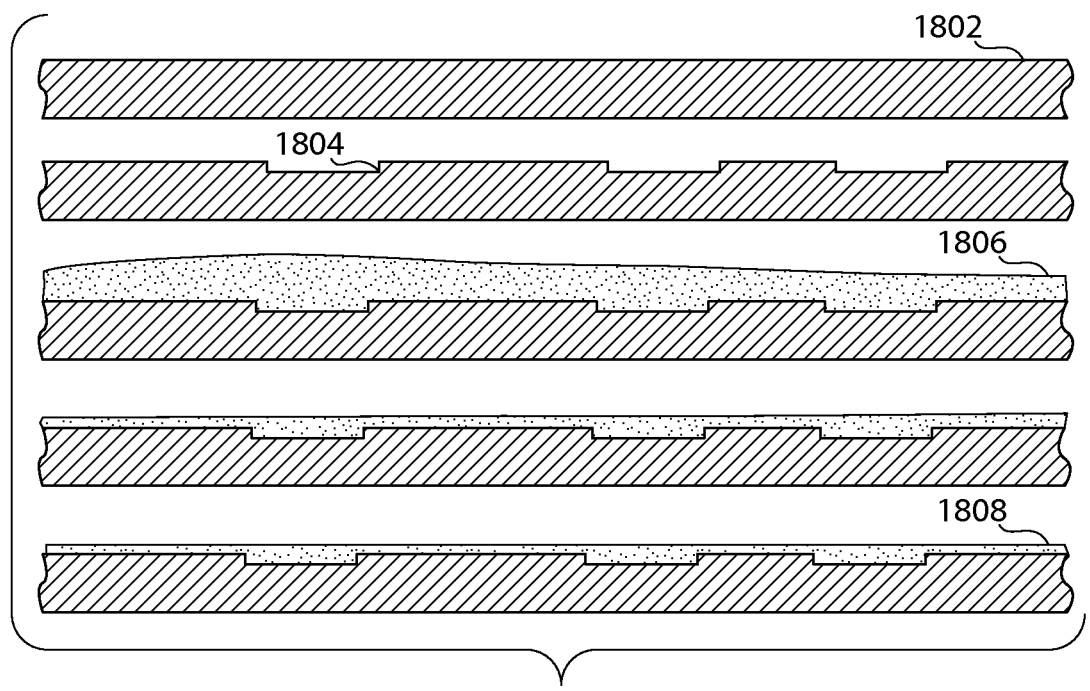

FIG. 18 depicts the fabrication of a reflector disk according to one embodiment of the invention.

Figure 19A:
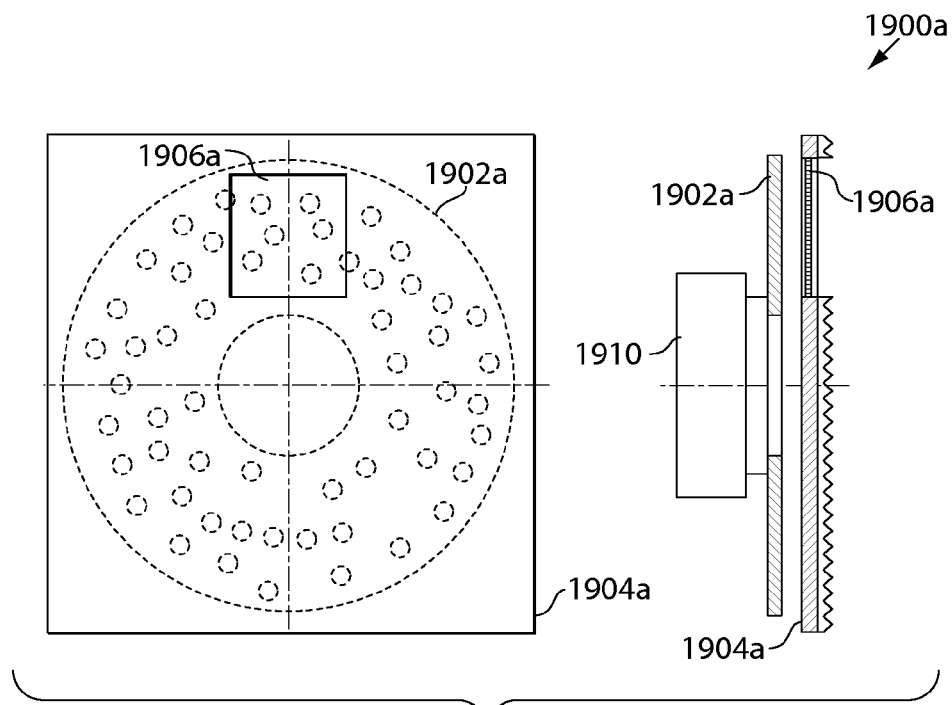
Figure 19B:
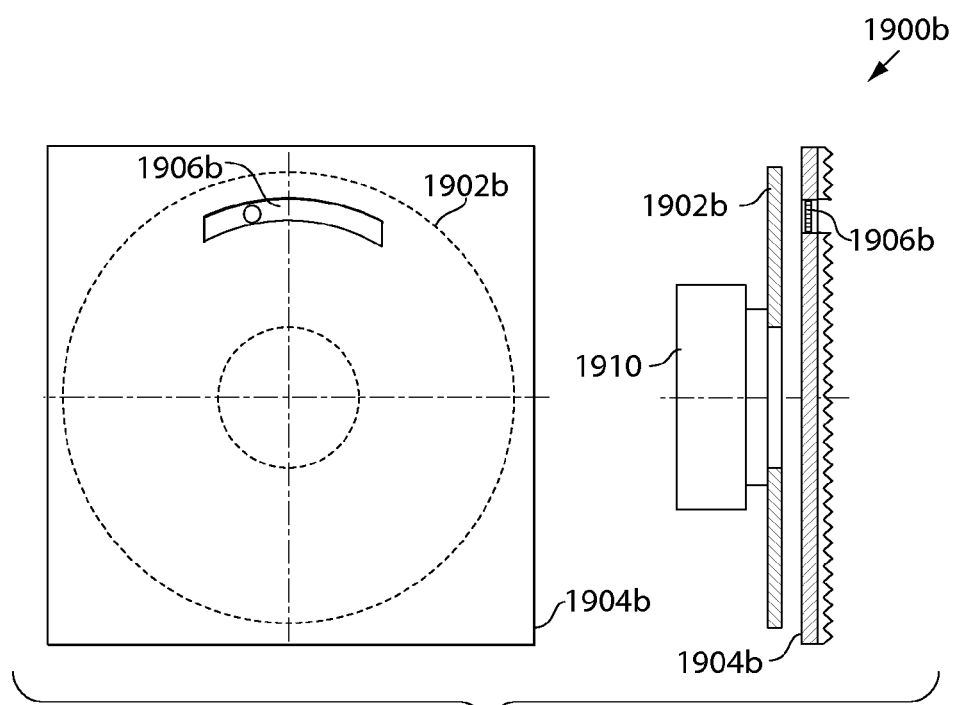

FIGS. 19A and 19B depict spatially-selective reflector device and motor assemblies according to various embodiments of the invention.

Figure 20:
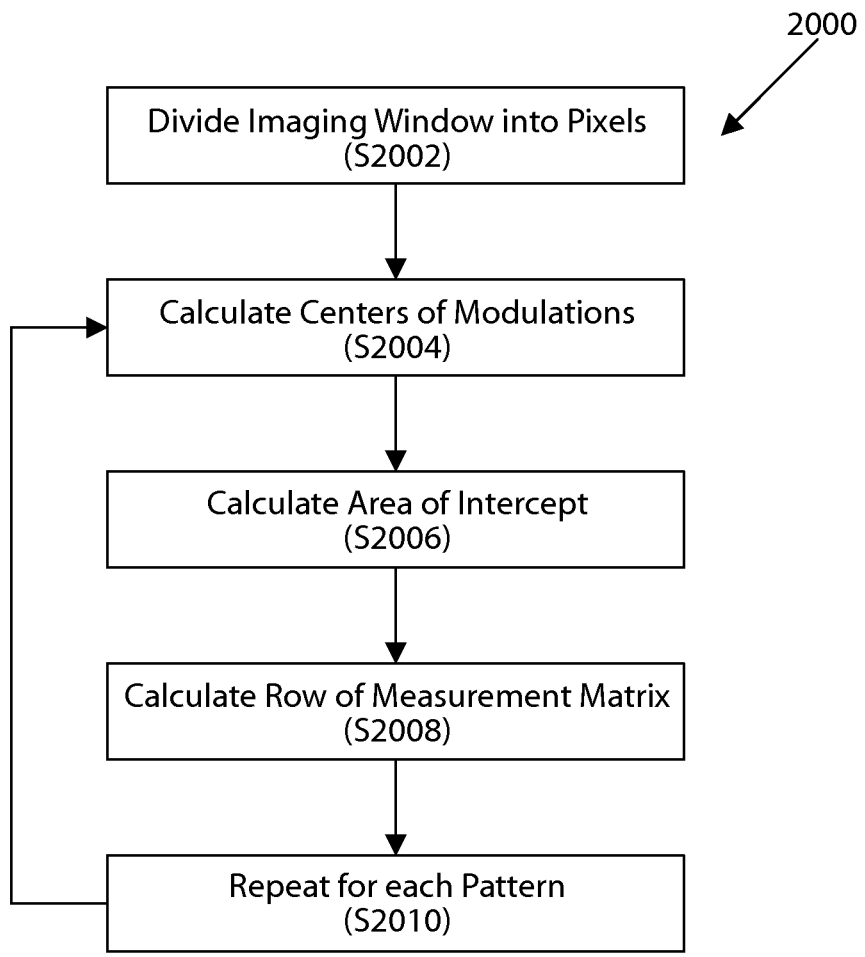

FIG. 20 depicts a method for calculating a measurement matrix according to an embodiment of the invention.

Figure 21:
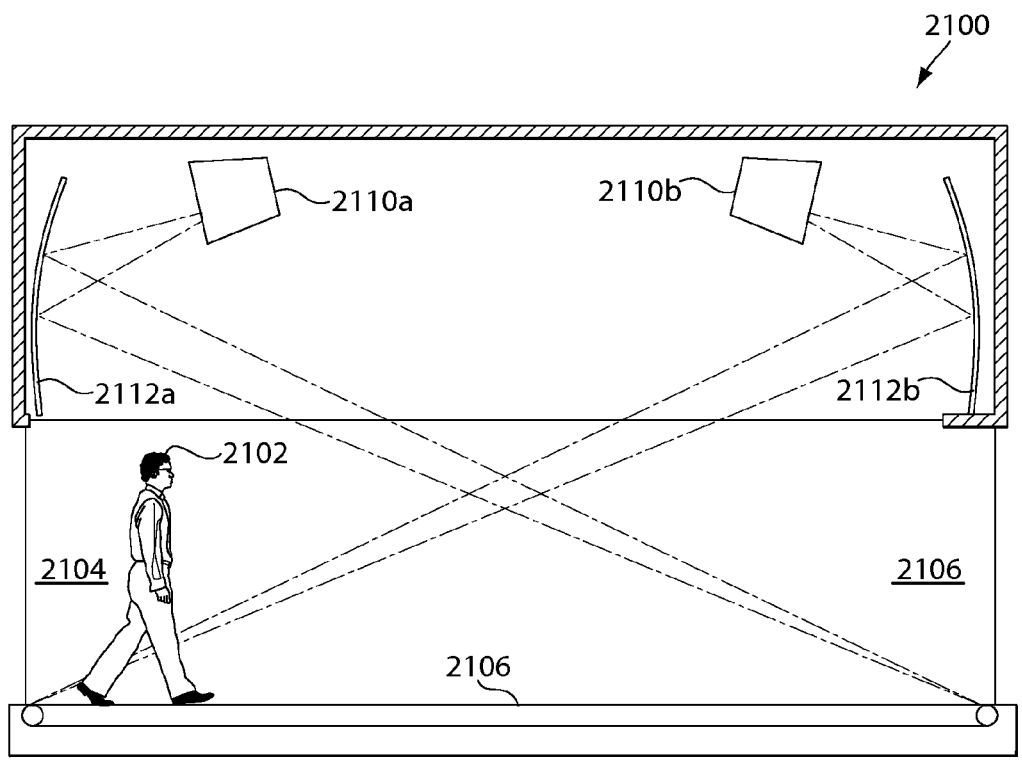

FIG. 21 depicts a profiling scanner incorporating the imaging devices described herein according to an embodiment of the invention.

DESCRIPTION OF THE INVENTION

Spatially-selective reflective structures are described along with systems and methods utilizing spatially-selective reflective structures. The spatially-selective reflective structures can be used to image targets using electromagnetic energy of a various wavelengths referred to herein as the "wavelength(s) of interest."

Spatially-Selective Reflective Structures

FIGS. 1A and 1B depict a side view and a cross-sectional view, respectively, of a spatially-selective reflective structure 100 according to one embodiment of the invention. Spatially-selective reflective structure 100 includes a partially-conducting slab 102 and a modulating reflector disk 104. The modulating reflector disk 104 includes a plurality of modulations 106a-h.

Modulations 106a-h are preferably uniform in size and shape. The modulations can be designed to maximally perturb the absorption properties of the partially-conducting slab 102 and reflector disk 104. Preferably, the modulations have well-defined edges, as depicted in FIG. 1A, which promote energy reflection. While particular sizes and shapes are not required, exemplary modulations can, in some embodiments, have a cross-sectional dimension greater or equal to about one wavelength of interest and extend above or below the surface of modulating reflector disk 104.

Figure 6A:
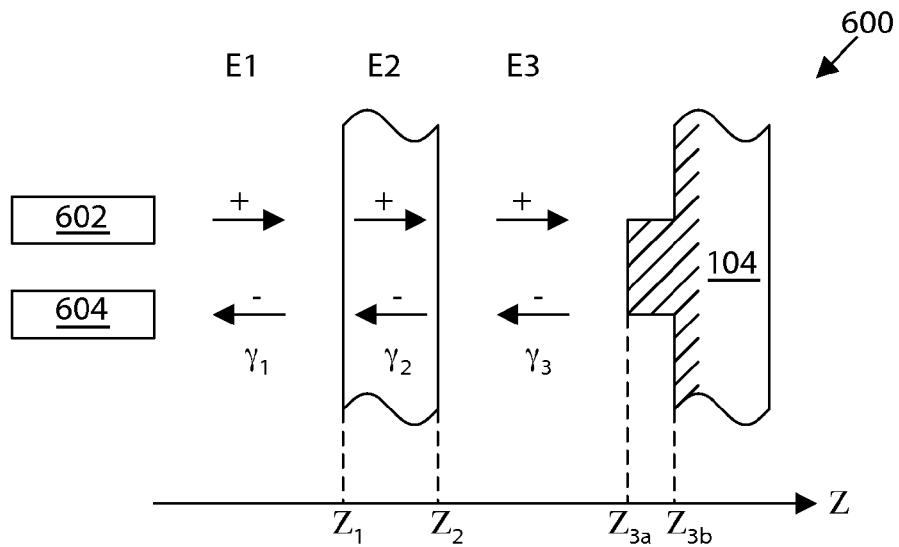
FIG. 6A depicts a three layer model for reflectivity of the spatially-selective reflective structure according to one embodiment of the invention.

The height or depth of the modulations 106 is generally about less than a wavelength of interest or a multiple of a half of one wavelength of interest plus about less than a half of one wavelength of interest. For example, modulation height H can be defined by the following formula:

$$H \approx n_m \frac{\lambda}{2} + d_m \frac{\lambda}{2} \tag{1}$$

wherein $n_m$ is a non-negative integer, λ is the wavelength of interest, and $0 \leq d_m \leq 1$. Parameter $d_m$ will vary depending on the properties of the partially-conducting slab 102 (e.g. the thickness of the slab 102, the electrical conductivity of the slab 102, and the electrical permittivity of the slab 102). For example, if a slab 102 is provided with a uniform electrical conductivity of 0.066 S/cm, thickness of 820 μm, and relative electrical permittivity of 11.9 F/m, and the frequency of interest is 640 GHz (λ=468.75 μm), the desired bump height $H_b$ (i.e., the distance from surface of the partially-conducting slab $z_2$ to the surface of bump $z_{3a}$ as depicted in FIG. 6A) for maximal reflection of radiation can be defined as follows:

$$H_b \approx n_m \frac{\lambda}{2} + \frac{47}{2}\mu m \approx n_m \frac{\lambda}{2} + 0.1\frac{\lambda}{2}. \tag{2}$$

The desired depression depth $H_d$ (i.e., the distance from the surface of the partially-conducting slab to the depression surface) for maximal reflection of radiation for the such a slab can be defined as follows:

$$H_d \approx n_m \frac{\lambda}{2} + \frac{347}{2} \mu m \approx n_m \frac{\lambda}{2} + 0.4 \frac{\lambda}{2}. \quad (3)$$

The partially-conducting slab 102 can be composed of a semiconductor materials including but not limited to: diamond, silicon, germanium, silicon carbide, silicon germanide, aluminum antimonide, aluminum arsenide, aluminum nitride, aluminum phosphide, boron nitride, boron phosphide, boron arsenide, gallium antimonide, gallium arsenide, gallium nitride, gallium phosphide, indium antimonide, indium arsenide, indium nitride, indium phosphide, aluminum gallium arsenide, indium gallium arsenide, indium gallium phosphide, aluminum indium arsenide, aluminum indium antimonide, gallium arsenide nitride, gallium arsenide phosphide, aluminum gallium nitride, aluminum gallium phosphide, indium gallium nitride, indium arsenide antimonide, indium gallium antimonide, aluminum gallium indium phosphide, aluminum gallium arsenide phosphide, indium gallium arsenide phosphide, aluminum indium arsenide phosphide, aluminum gallium arsenide nitride, indium gallium arsenide nitride, indium aluminum arsenide nitride, gallium arsenide antimonide nitride, gallium indium nitride arsenide antimonide, gallium indium arsenide antimonide phosphide, cadmium selenide, cadmium sulfide, cadmium telluride, zinc oxide, zinc selenide, zinc sulfide, zinc telluride, cadmium zinc telluride, mercury cadmium telluride, mercury zinc telluride, mercury zinc selenide, cuprous chloride, lead selenide, lead sulfide, lead telluride, tin sulfide, tin telluride, lead tin telluride, thallium tin telluride, thallium germanium telluride, bismuth telluride, cadmium phosphide, cadmium arsenide, cadmium antimonide, zinc phosphide, zinc arsenide, zinc antimonide, lead(II) iodide, molybdenum disulfide, gallium selenide, tin sulfide, bismuth sulfide, copper indium gallium selenide, platinum silicide, bismuth(III) iodide, mercury(II) iodide, thallium(I) bromide, titanium dioxide (anatase), copper(I) oxide, copper(II) oxide, uranium dioxide, and uranium trioxide. The partially-conducting slab 102 can be composed of one or more organic semiconductors. The partially-conducting slab 102 and magnetic semiconductors such as magnetite, manganese-doped indium arsenide, manganese-doped gallium arsenide, manganese-doped indium antimonide, manganese- and iron-doped indium oxide, manganese-doped zinc oxide, n-type cobalt-doped zinc oxide, cobalt-doped titanium dioxide, chromium-doped rutile, iron-doped rutile, iron-doped anatase, nickel-doped anatase, manganese-doped tin dioxide, and iron-doped tin dioxide.

The partially-conducting slab 102 can additionally or alternatively be a dielectric loaded with conductive particles, such as ions, silver, gold, copper, aluminum, platinum, iron, carbon black, and alloys thereof. The conductive particles can be introduced into the dielectric in a manner similar to semiconductor doping techniques.

The partially-conducting slab 102 can be a non-conductive material coated with a thin metal film, such as silver, gold, copper, aluminum, platinum, iron, and alloys thereof. The film can be applied with coating techniques such as physical vapor deposition (PVD) or chemical vapor deposition (CVD). It will be appreciated by one of skill in the art that many other methods can be used and that certain methods may be advantageous for particular coatings and/or non-conductive materials.

The thin metal film can be any film thinner than the wavelength of interest. In some embodiments, the thin metal coating is less than about 10 angstroms thick. In some embodiments, the thin metal film can have a resistivity of about 377Ω/☐, particularly where the radiation angle of incidence is less than 20° from the normal of the structure. Thin metal films with other resistivities can also be utilized depending on the specifications of the device. For example, the resistivity can be between about 225Ω/☐, about 250Ω/☐, about 275Ω/☐, about 300Ω/☐, about 325Ω/☐, about 350Ω/☐, about 375Ω/☐, about 400Ω/☐, about 425Ω/☐, about 450Ω/☐, about 475Ω/☐, about 500Ω/☐, about 525Ω/☐, about 550Ω/☐, about 575Ω/☐, and the like.

In some embodiments, the partially-conducting slab has a uniform conductivity profile value of about 0.066 Siemens per centimeter (S/cm).

In some embodiments, the modulating reflector disk 104 is composed of a metal. The metal can, in some embodiments, be a highly-conductive metal such as copper, silver, and aluminum.

The partially-conducting slab 102 and the modulating reflector disk 104 can be separated by a gap 108 and can be coupled with one or more mechanical fasteners 110a-d, such as screws, bolts, nails, rivets, and the like. For example, the fasteners 110a-d can be bolts or screws coupled with one or more spacers such as washers. One or more of the washers can be selectively removed to adjust the gap 108. The gap 108 need not be devoid of any material. Rather, the gap 108 can be open to the atmosphere. In other embodiments, the partially-conducting slab 102 and the modulating reflector disk 104 are bonded with a submillimeter wavelength transparent adhesive that functions as a gap 108.

In other embodiments, the partially-conducting slab 102 and the modulating reflector disk 104 can be free of each other. The modulating reflector disk 104 can be rotated while it is kept parallel to the partially-conducting slab 102.

The gap 108 can be configured to achieve maximal absorption of incident electro-magnetic radiation at submillimeter wavelengths. In some embodiments (e.g., embodiments in which the gap G is air), the gap G is defined as $$G \approx n_g \frac{\lambda}{2} + d_g \frac{\lambda}{2} \quad (4)$$

wherein $n_g$ is a non-negative integer, $\lambda$ is the wavelength of interest, and $0 \leq d_g \leq 1$. Parameter $d_g$ will vary depending on the properties of the partially-conducting slab 102. The properties of the partially-conducting slab 102 affecting $d_g$ are the thickness of the slab 102, the electrical conductivity of the slab 102, and the electrical permittivity of the slab 102. For example, if a slab 102 is provided with a uniform electrical conductivity of 0.066 S/cm, thickness of 820 µm, and relative electrical permittivity of 11.9 F/m, and the frequency of interest is 640 GHz ($\lambda$=468.75 µm), the desired gap G between the plates for maximal absorption of radiation can be expressed as follows:

$$G \approx n_g \frac{\lambda}{2} + \frac{78}{2} \approx n_g \frac{\lambda}{2} + 0.16 \frac{\lambda}{2}. \quad (5)$$

Parameters $n_g$ and $n_m$ can, but need not necessarily equal each other modulations when the modulations are depressions, but are preferably different when the modulations are bumps. $d_g$ and $d_m$ are preferably different in either case. Parameters $n_g$ and $n_m$ are preferably as small as possible, particularly where the modulations are depressions.

In other embodiments in which the partially-conducting slab 102 is made of a non-conductive material coated with a thin metal film on the side adjacent to the reflecting disk 104, the gap 108 can be about one odd multiple of a quarter of a wavelength of the energy to be detected. For example, if the wavelength to be detected is about 2,800 µm, the gap 108 can be about 700 µm (if the modulations are depressions), about 2,100 µm, about 3,500 µm, and so on.

Figure 1C:
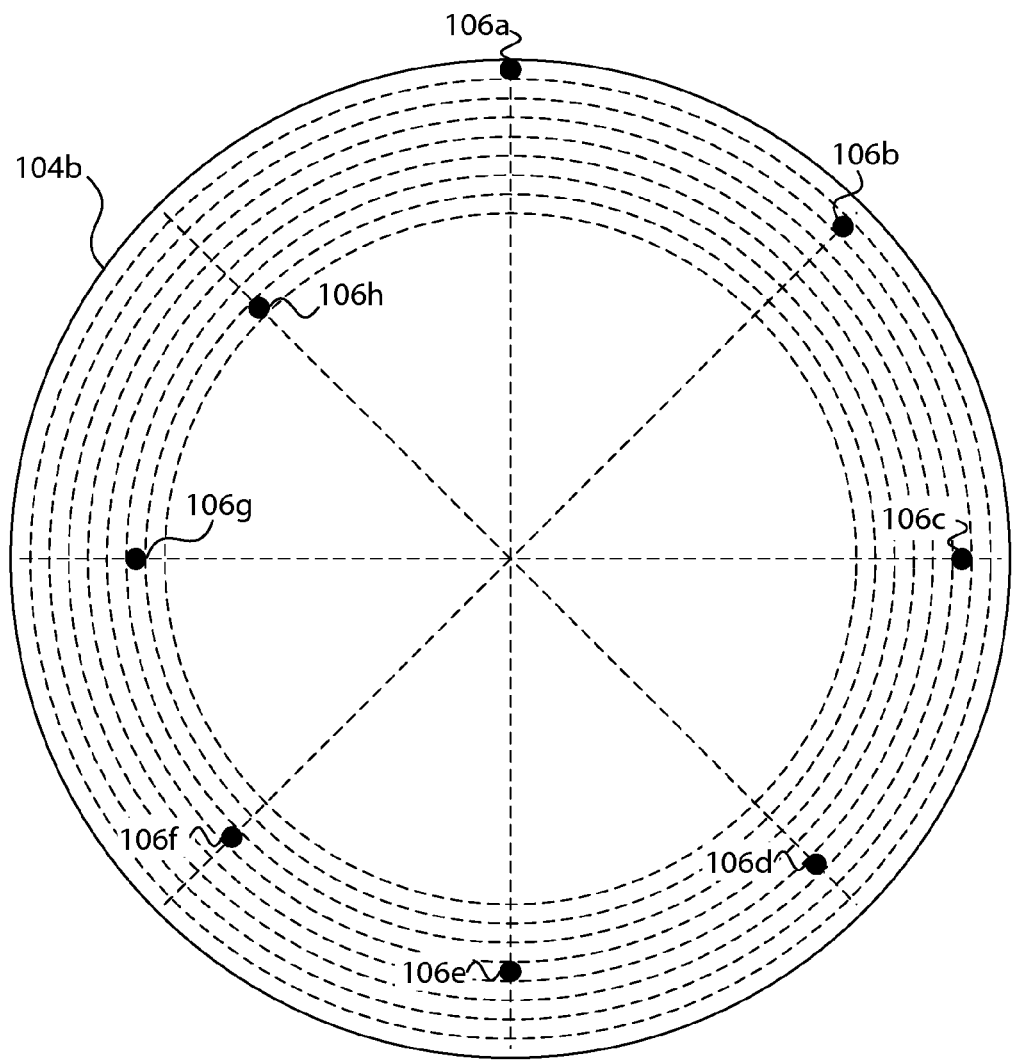
FIG. 1C depicts a reflecting disk with a plurality of modulations arranged in a single-turn spiral according to one embodiment of the invention.
Figures 2A, 2B, 2C:
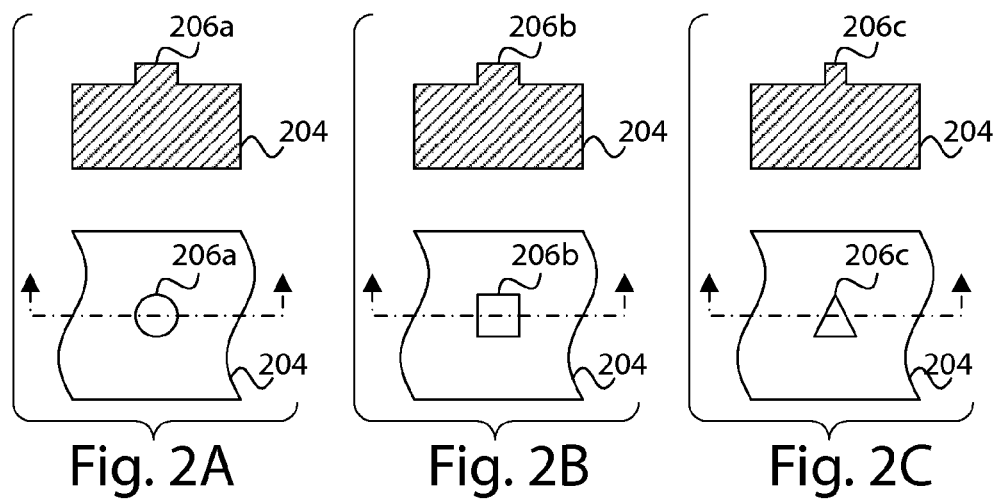
FIGS. 2A-2F depict several modulation profiles according to some embodiments of the invention.
Figures 2D, 2E, 2F:
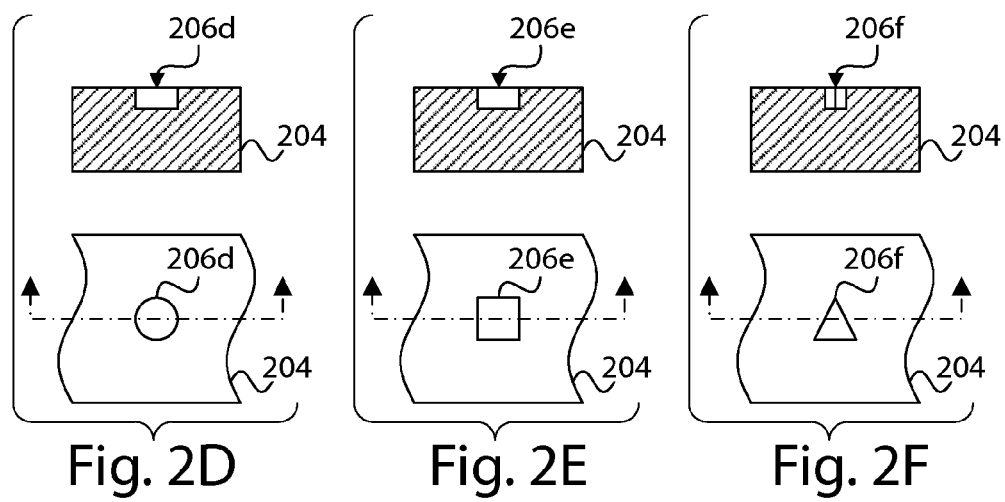

In some embodiments, the modulations 106 are arranged in a single-turn spiral starting from an external radial point of the reflecting disk 104 and proceeding to the center of the disk 104 in a manner similar to a gramophone record. In order to minimize the curvature of scan lines, a large disk 104 can be used with small modulations 106 located closer to the perimeter of the disk. An example of such a disk is depicted in FIG. 1C.

As depicted in FIGS. 2A-H, modulations 206 can be either bumps (206a, 206b, 206c) or depressions (206d, 206e, 206f). Modulations 206 can be any shape including a cylinder (206a, 206d), a cuboid (206b, 206e), and right triangular prism (206c, 206f). The shape of modulation 206 may have a diminishing effect on the quality or quantity of reflections as the modulations decrease in size. The face of the modulations 206 are preferably parallel to the face of partially-conductive slab 102 and modulating reflector disk 104.

The spatially-selective reflective structure 100 provided herein is particularly useful for submillimeter imaging and other imaging techniques where the resolution of existing imagers is constrained either by technology or cost.

Imaging Systems

FIG. 3A depicts a system 300 incorporating a spatially-selective reflective structure 302. A submillimeter wave source 304 emits radiation at a desired wavelength. Submillimeter wave source 304 exposes object of interest 306 with submillimeter waves, which are reflected to submillimeter optics 308. Focusing mirror 308 directs the reflection to spatially-selective reflective structure 302. As spatially-selective reflective structure 302 is spun by motor 310, modulations 312 are individually brought into the focal plane of focusing minor 308 and reflect the submillimeter wave to submillimeter receiver 314.

Submillimeter radiation (also known as "terahertz radiation", "terahertz waves", "terahertz light", "T-rays", "T-light", "T-lux", and "THz") is generally used to describe the region of the electromagnetic spectrum between about 300 gigahertz ($3 \times 10^{11}$ Hz) and about 3 terahertz ($3 \times 10^{12}$ Hz), which corresponds to wavelength ranges between about 1 millimeter and about 100 micrometers. Submillimeter radiation can be produced by devices such as gyrotrons, backward wave oscillators (BWOs), far infrared lasers (FIR lasers), quantum cascade lasers, free electron lasers (FELs), synchrotron light sources, and photomixing devices.

Gyrotrons are available from Communications & Power Industries of Palo Alto, Calif.; Gyrotron Technology, Inc. of Bensalem, Pa.; Thales Group of Neuilly-sur-Seine, France; and Toshiba Corporation of Tokyo, Japan. Backward wave oscillators are described in U.S. Pat. No. 2,880,355. Far infrared lasers are available from Zaubertek, Inc. of Oviedo, Fla., Laser 2000 GmbH of Munich, Germany, and Coherent, Inc. of Santa Clara, Calif. Quantum cascade lasers are described in U.S. Pat. Nos. 7,359,418 and 7,386,024 and U.S. Patent Application Publication Nos. 2008/0069164 and 2008/0219308. Free electron lasers are described in U.S. Pat. No. 7,342,230. Synchrotron light sources are available from Lyncean Technologies, Inc. of Palo Alto, Calif. Photomixing devices are described in U.S. Pat. Nos. 7,105,820 and 7,326,930 and U.S. Patent Application Publication Nos. 2005/0156110; 2006/0054824; and 2007/0229937. Integrated submillimeter generators and detectors are available under the PICOMETRIX® T-RAY™ trademark from Advanced Photonix, Inc. of Ann Arbor, Mich.

Submillimeter optics 308 can include one or more focusing mirrors (also known as "concave mirrors") are available from suppliers such as Edmund Optics Inc. of Barrington, N.J. Focusing minors can composed of glass, metal, or other materials capable of reflecting submillimeter radiation. Suitable mirrors (e.g. gold-coated aluminum substrates) are available from RadiaBeam Technologies, LLC of Marina Del Ray, Calif.

Motor 310 spins at a speed sufficient to produce a desired number of frames per minute. For example, if the receiver 314 is to capture images at a rate of 30 frames per second, motor 310 can spin spatially-selective reflective structure 302 at a rate of 1,800 revolutions per minute. Motor 310 can, in some embodiments, be a servomechanical device capable of actuation to defined rotational positions and/or capable of self-correction of deviations from a desired rotational position and/or speed.

Imaging Methods

Figure 4A:
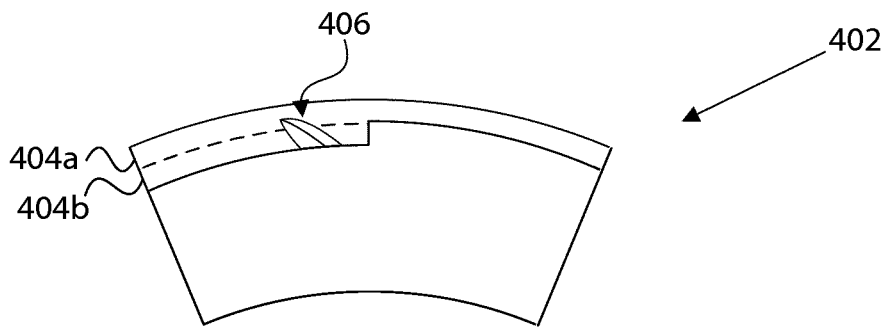
FIGS. 4A-4C depict the acquisition of an image according to one embodiment of the invention.
Figure 4B:
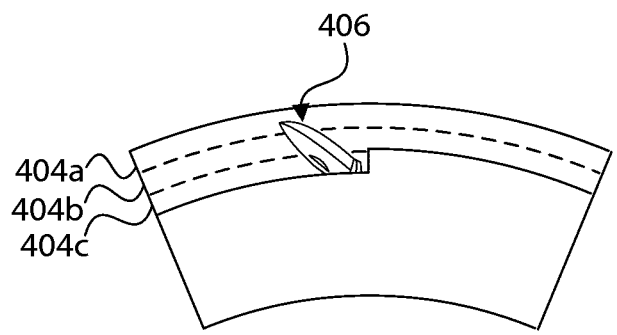
Figure 4C:
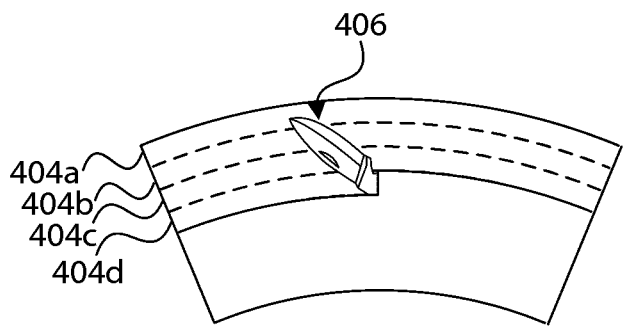

Referring to FIGS. 4A-4C, an image of object 306 (in this example, a knife) is acquired by submillimeter receiver 314 from a spatially-selective reflective structure 302, e.g. a spatially-selective reflective structure including a modulating reflector disk 104 as depicted in FIG. 1C. Receiver 314 focuses on a viewing window 402 on the spatially-selective reflective structure 302. Viewing window 402 can be a physical opening in a absorptive material or can be a region that the receiver 314 focuses on while the spatially-selective reflective structure 302 rotates through the viewing window 402. The absorptive material can be positioned adjacent to the partially-conductive slab 102 or receiver 314 and is preferably positioned as close to the partially-conductive slab as possible. Suitable absorptive materials include ECCOSORB® materials (available from Emerson & Cuming of Randolph, Mass.) and radar absorbent materials (RAM).

As the spatially-selective reflective structure 302 rotates, the modulation 106a on the outer radius of the spiral enters the viewing window 402. The energy reflected from the modulation is recorded as the modulation 106a moves across the window. The recorded data is represented and stored as a function of the modulation position, as depicted as element 404a in FIGS. 4A-4C. The process continues with modulations 106b, 106c, 106d, 106e, 106f, 106g, 106h to image rows 404b, 404c, 404d, 404e, 404f, 406g, 404h, respectively. At this point, modulation 106a reenters the viewing window 402 and the process is repeated to capture another image.

Figure 5:
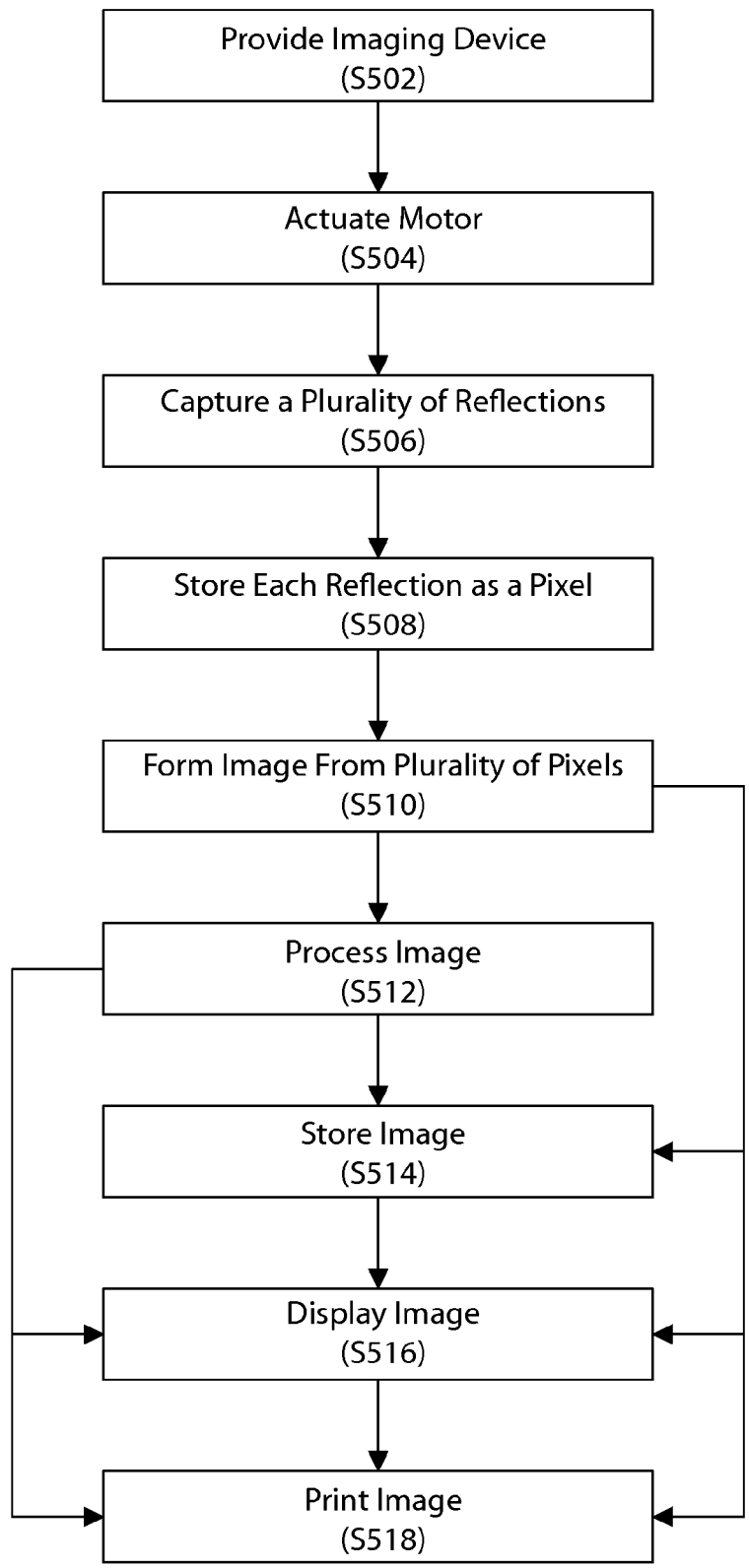
FIG. 5 depicts an imaging method according to one embodiment of the invention.

FIG. 5 depicts an imaging method according to one embodiment of the invention. In step S502, an imaging device is provided, for example an imaging device described herein. The imaging device can include submillimeter wave optics, a spatially-selective reflective structure, a motor configured to rotate the spatially-selective reflective structure, and a submillimeter wave receiver as described herein. In step S504, the motor is actuated to rotate the spatially-selective reflective structure. In step S506, a plurality of reflections are captured by the submillimeter wave receiver. In step S508, each reflection is stored as a pixel. In step S510, an image is formed from a plurality of pixels.

In step S512, the image can be processed with an image recognition method capable of identifying suspicious items that could be a weapon or contraband. Various suitable methods are known to those of skill in the art and include edge detection algorithms and artificial intelligence algorithms (e.g. neural nets) such as those described in U.S. Pat. Nos. 7,310,442 and 7,417,440 and U.S. Patent Application Publication No. 2008/0212742 and in Mohamed-Adel Slamani et al., "Image Processing Tools for the Enhancement of Concealed Weapon Detection," 3 *Proc. Int'l Conf. on Image Processing* 518-22 (October 1999). One or more privacy algorithms can also be applied to the images to obscure sensitive regions such as human genitalia.

In step S514, the image can be stored either by dedicated hardware or software or by a general purpose computer programmed to acquire, store, display, and/or transmit the images.

The images can be stored in variety of formats including known and proprietary vector graphics formats such as vector graphics formats and raster graphics formats. Vector graphics (also called geometric modeling or object-oriented graphics) utilize geometrical primitives such as points, lines, curves, and polygons to represent images. Examples of vector graphics formats include the Scalable Vector Graphics (SVG) and Vector Markup Language (VML) formats. The SVG format is defined at W3C, *Scalable Vector Graphics* (*SVG*), http://www.w3.org/Graphics/SVG/. VML is described in Brian Matthews, et al., *Vector Markup Language* (*VML*), http://www.w3.org/TR/1998/NOTE-VML-19980513. Alternatively, the images can be converted to or maintained in a raster graphics format, which is a representation of images as a collection of pixels. Examples of raster graphics formats include JPEG, TIFF, RAW, PNG, GIF, and BMP.

The images can also be compiled into a video format such as BETAMAX®, BLU-RAY DISC®, DVD, D-VHS, Enhanced Versatile Disc (EVD), HD-DVD, Laserdisc, M-JPEG, MPEG-1, MPEG-2, MPEG-4, Ogg-Theora, VC-1, VHS, and the like.

Image and/or video files can be stored on media such as magnetic media (e.g. tapes, discs), optical media (e.g. CD-ROM, CD-R, CD-RW, DVD, HD DVD, BLU-RAY DISC®, Laserdisc), punch cards, and the like. Image and/or video files can also be transmitted to a remote storage device by a variety of standards such as parallel or serial ports, Universal Serial Bus (USB), USB 2.0, Firewire, Ethernet, Gigabit Ethernet, and the like.

In step S516, the images or video can be displayed on a display device such as a cathode ray tube (CRT), a plasma display, a liquid crystal display (LCD), an organic light-emitting diode display (OLED), a light-emitting diode (LED) display, an electroluminescent display (ELD), a surface-conduction electron-emitter display (SED), a field emission display (FED), a nano-emissive display (NED), an electrophoretic display, a bichromal ball display, an interferometric modulator display, a bistable nematic liquid crystal display, and the like.

In step S518, images can also be printed with devices such laser printers, ink jet printers, dot matrix printers and the like.

As one will appreciate, the steps of the methods described herein can be configured to place various steps in various orders and may include additional steps or omit steps listed in FIG. 5. Specifically, one of skill in the art will realize that image handling steps S512, S514, S516, and S518 can be practiced various orders and/or combinations.

Optimization of Spatially-Selective Reflective Structures

Referring now to FIG. 6, the reflectivity of a spatially reflective structure can be represented with a three layer model 600. Radiation from source 602 (e.g. reflections from an object of interest), passes through the air (E1), partially-conducting slab (E2) and gap (E3), before reflecting off the modulating reflector disk 104 before passing through partially-conducting slab (E2) and air (E1) and being imaged by imager 604. The electric field for each layer (E1, E2, E3) can be expressed in the following matrices, where $E_i^{\pm}$ is the electric field in the $i^{th}$ layer and the plus or minus sign indicates the direction of propagation as depicted in FIG. 6:

$$\begin{bmatrix} e^{j\gamma_1 z_1} & -e^{-j\gamma_2 z_1} & -e^{j\gamma_2 z_1} & 0 & 0 \\ \frac{e^{j\gamma_1 z_1}}{\eta_1} & -\frac{e^{-j\gamma_2 z_1}}{\eta_2} & \frac{e^{j\gamma_2 z_1}}{\eta_2} & 0 & 0 \\ 0 & e^{-j\gamma_2 z_2} & e^{j\gamma_2 z_2} & -e^{-j\gamma_3 z_2} & -e^{-j\gamma_3 z_2} \\ 0 & \frac{e^{-j\gamma_2 z_2}}{\eta_2} & -\frac{e^{j\gamma_2 z_2}}{\eta_2} & -\frac{e^{-j\gamma_3 z_2}}{\eta_3} & \frac{e^{j\gamma_3 z_2}}{\eta_3} \\ 0 & 0 & 0 & e^{-j\gamma_3 z_3} & e^{j\gamma_3 z_3} \end{bmatrix} \begin{bmatrix} E_1^- \\ E_2^- \\ E_2^+ \\ E_3^- \\ E_3^- \end{bmatrix} = \quad (6)$$

$$\begin{bmatrix} -E_1^+ e^{-j\gamma_1 z_1} \\ -\frac{E_1^+}{\eta_i} e^{-j\gamma_1 z_1} \\ 0 \\ 0 \\ 0 \end{bmatrix}$$

The variable $z_i$ is the thickness of the layer.

The complex propagation constants for each layer are given by the formula $\gamma_i = \alpha_i + \beta_i$ with $$\alpha_i = \omega \left\{ \frac{\mu_i \varepsilon_i'}{2} \left[ \sqrt{1 + \frac{\varepsilon_i''}{\varepsilon_i'}} - 1 \right] \right\}^2 \quad (7a)$$

and $$\beta_i = \omega \left\{ \frac{\mu_i \varepsilon_i'}{2} \left[ \sqrt{1 + \frac{\varepsilon_i''}{\varepsilon_i'}} + 1 \right] \right\}^2. \quad (7b)$$

The impedance for each layer is given by $$\eta_i = \sqrt{\frac{\mu_i}{\varepsilon_i'}} \left( 1 - j\frac{\varepsilon_i''}{\varepsilon_i'} \right)^{\frac{1}{2}}. \quad (8)$$

In equations (7) and (8), $\epsilon_i' \equiv \epsilon_i$ (the dielectric permittivity of layer i) and $$\varepsilon_i'' \equiv \frac{\sigma_i}{\omega}$$

where $\sigma_i$ is the conductivity of the layer. The radial frequency is given by $\overline{\omega} = 2\pi f$ where f is the frequency of the terahertz field. The layers are assumed to be non-magnetic, so that $\mu_i = \mu_0$, which is the magnetic permeability of free space.

Matrix equation (6) can be easily solved with the help of numerical computing software such as MATLAB®, available from The MathWorks of Natick, Mass., MAPLE®, available from Waterloo Maple, Inc. of Waterloo, Ontario, and the like. The reflection coefficient Γ can be obtained from the ratio $$\Gamma = \left|\frac{E_1^-}{E_1^+}\right|.$$

Figure 6B:
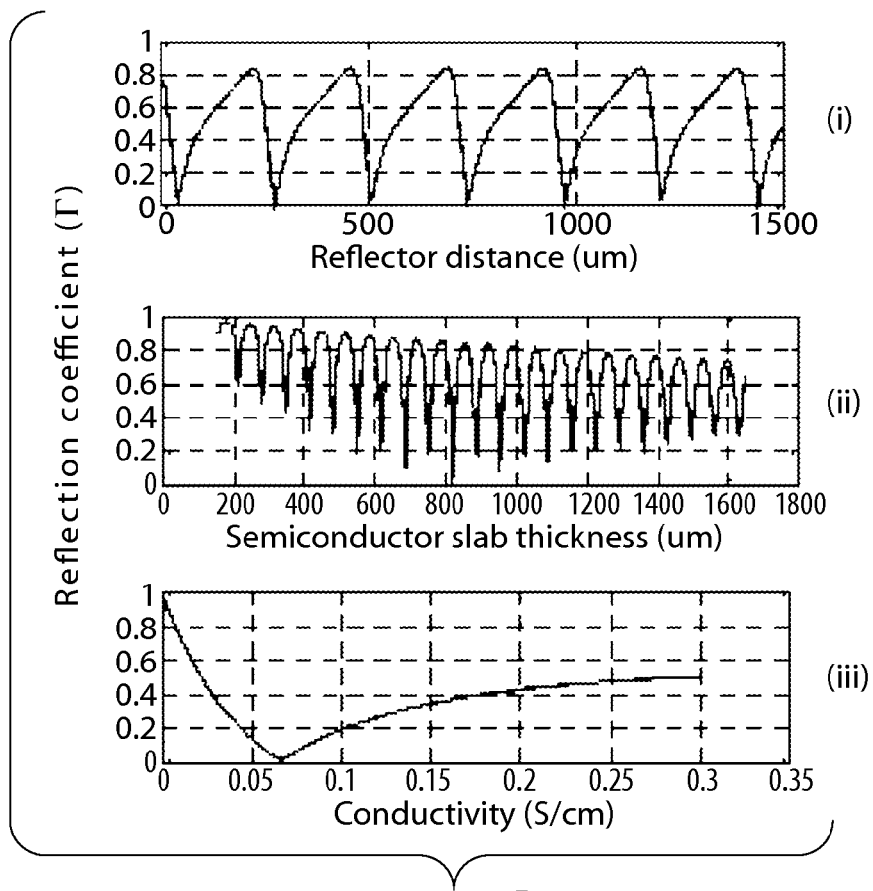
FIG. 6B depicts reflection coefficient Γ as a function of gap distance, partially-conductive slab thickness, and partially-conductive slab conductivity.

FIG. 6B depicts reflection coefficient Γ as a function of gap distance (i.e. $z_3$-$z_2$), partially-conductive slab thickness (i.e. $z_2$-$z_1$), and partially-conductive slab conductivity. FIG. 6B(i) depicts reflection coefficient Γ as a function of reflector distance for a slab with conductivity 0.066 S/cm and thickness 820 μm. FIG. 6B(ii) depicts reflection coefficient Γ as a function of slab thickness for a slab with conductivity 0.066 S/cm and reflector distance of 1440 μm. FIG. 6B(iii) depicts reflection coefficient Γ as a function of slab conductivity for a slab of thickness 820 μm and reflector distance of 1440 μm.

As discussed herein, modulation height is preferably selected for maximal reflection of radiation while gap G is preferably selected for maximal absorption of radiation. These values can be identified by selecting a local maxima in FIG. 6B(i) for the modulation height or depth and selecting a local minima in FIG. 6B(i) for the gap value. In generally, optimal modulation heights approximate multiples of one-half of the wavelength of energy to be detected.

Further Reflector Disks

Figure 7:
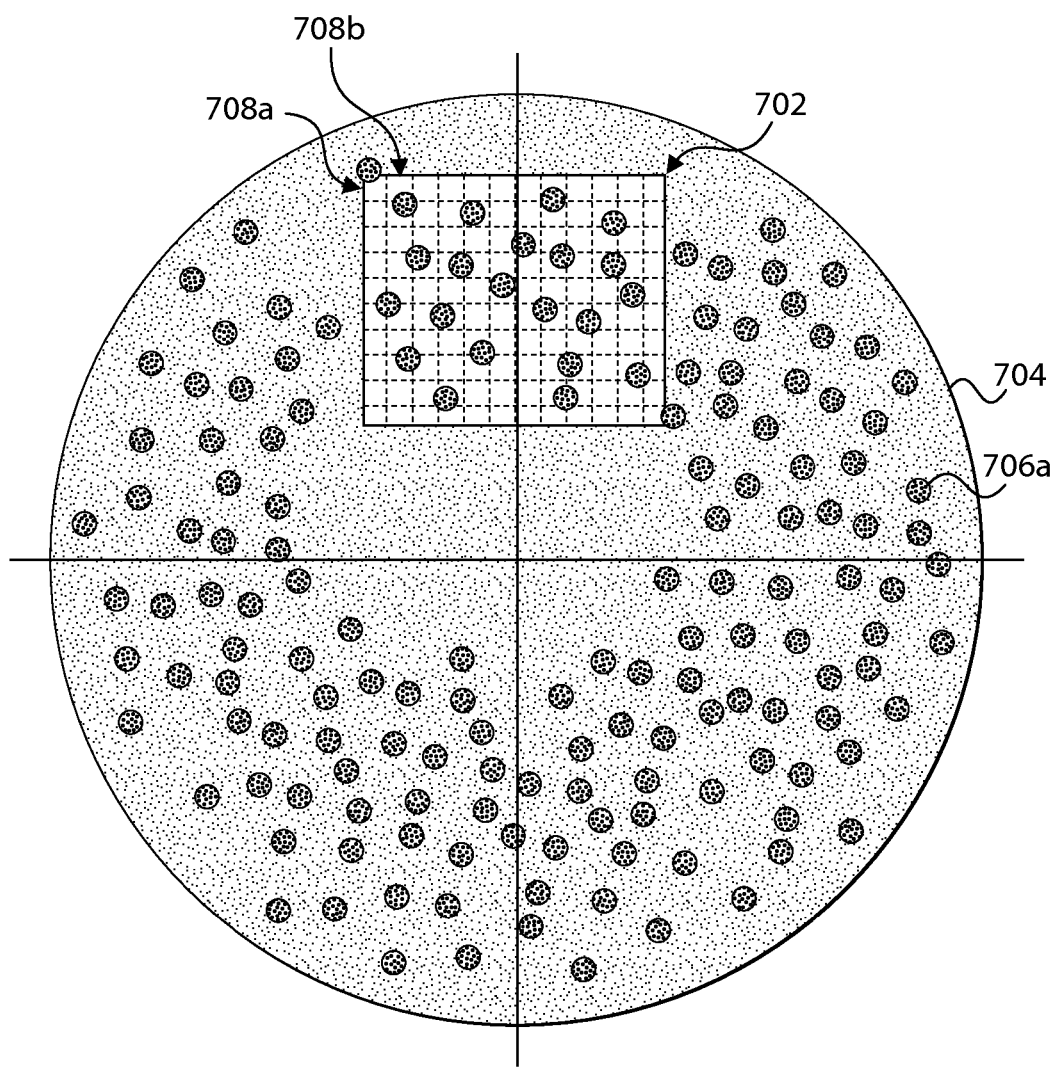
FIG. 7 depicts an embodiment of a modulating reflector disk including a plurality of randomly-positioned modulations.

Referring now to FIG. 7, another embodiment of a modulating reflector disk 704 is depicted. Modulating reflector disk 704 includes a plurality of modulations 706 that are arranged in such a manner that as the disk 704 is rotated the orientation of modulations 706 produces a matrix having linearly independent rows as discussed herein, thus ensuring that the inverse of the matrix exists. Although random placement of pixels will almost always produce such an arrangement, the arrangement of modulations can be produced by a human or by a computer algorithm.

In order to utilize modulating reflector disk 704, receiver 314 focuses on a viewing window 702 as discussed above in the context of FIGS. 3 and 4 herein. However, instead of defining viewing window 702 to encompass a single modulation at any given time as in FIG. 4, viewing window 702 can encompass a plurality of modulations 706.

In order to permit a low resolution receiver 314 (e.g., a single-pixel imager such as a submillimeter antenna) to capture multi-pixel images, viewing window 702 is divided into a plurality of arbitrary, non-physical pixels 708.

Figure 8:
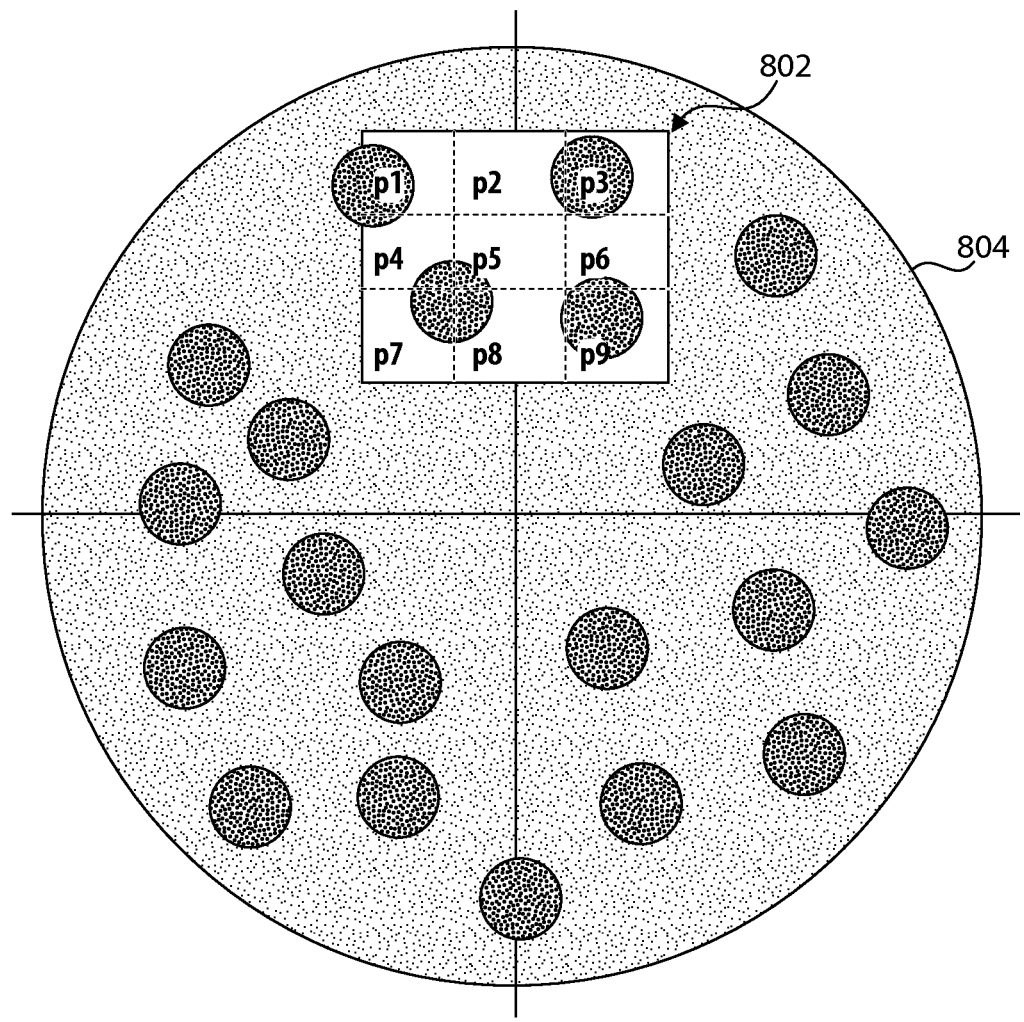
FIG. 8 depicts an exaggerated modulating reflector disk and a nine-pixel viewing window.
Figure 9:
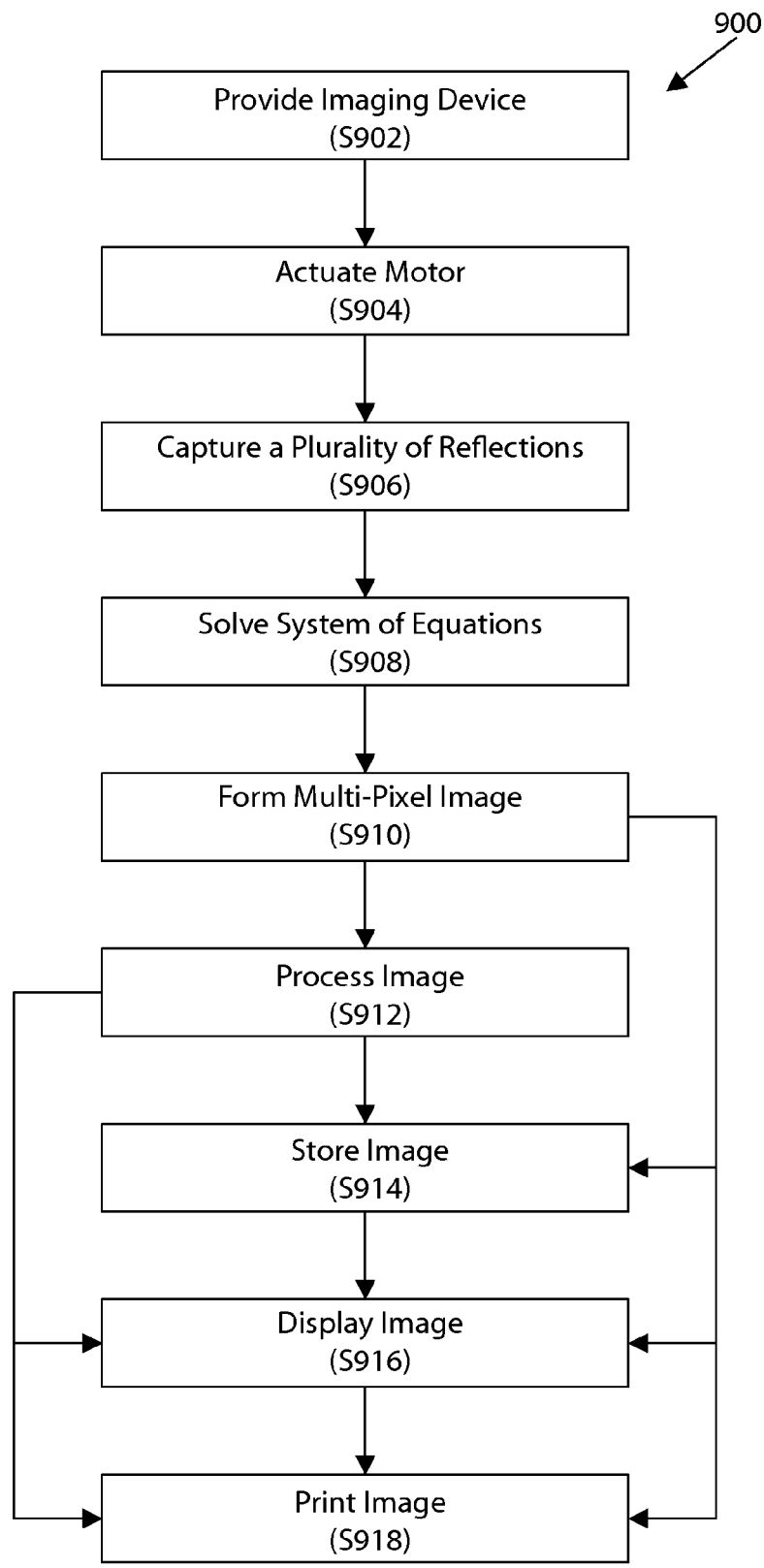
FIG. 9 depicts a method of creating a multi-pixel image according to one embodiment of the invention.

FIG. 8 depicts an exaggerated disk 804 and a viewing window 802 having nine pixels $p_1$-$p_9$ in order to depict an imaging method 900 described in FIG. 9. In step S902, an imaging device is provided (e.g., an imaging device as described herein). As the disk 804 is rotated (S904), receiver 314 takes a number of measurements equal to the number of arbitrary pixels in viewing window 802 (S906). For example, in the nine-pixel embodiment depicted in FIG. 8, receiver 314 can take a measurement at 40° increments of rotation of disk 804.

Measurements need not occur at regular intervals and need not encompass a complete revolution of disk 804. For example, in the nine-pixel embodiment depicted in FIG. 8, receiver 314 can take measurements at 10° increments of rotation of disk 804 to obtain four 3×3 images. In such an embodiment, measurements at 0°, 10°, 20°, 30°, 40°, 50°, 60°, 70°, and 80° are used to produce a first image; measurements at 90°, 100°, 110°, 120°, 130°, 140°, 150°, 160°, and 170° are used to produce a second image; measurements at 180°, 190°, 200°, 210°, 220°, 230°, 240°, 250°, and 260° are used to produce a third image; and measurements at 270°, 280°, 290°, 300°, 310°, 320°, 330°, 340°, and 350° are used to produce a fourth image.

The measurements used to generate consecutive images can overlap. For example, if one seeks to obtain a plurality of 18×18 pixel images, 324 measurements are required for each image. If measurements are obtained at 1° increments, the first image can be obtained from measurements from 0° to 323°, the second image can be obtained from measurements from 324° of the first revolution to 286° of the second revolution, and so on.

Although it is possible to obtain series of images that are each captured at a unique set of rotational positions, it may be preferable in some embodiments to capture each image at the same set of rotational positions (e.g., 1° increments from 0° to 323° on each revolution) in order to minimize processing and storage requirements by only storing a single, pre-calculated measurement matrix (see equation 10) and its inverse (see equation 11).

In order to produce a multi-pixel image, the fraction of the each pixel area that is backed by a modulation is calculated for each rotational position at which a measurement will be taken. For example, at the rotational position depicted in FIG. 8, 40% of pixel $p_1$, 15% of pixel $p_2$, 55% of pixel $p_3$, 22% of pixel $p_4$, 20% of pixel $p_5$, 8% of pixel $p_6$, 43% of pixel $p_7$, 36% of pixel $p_8$, and 70% of pixel $p_9$ are backed by one or more modulations. At this first position, a measurement $m_1$ is taken. This measurement $m_1$ will reflect the signal reflected onto receiver 314 by the portion of viewing window 802 that is backed by modulations as reflected in equation (9) below.

$$m_1 = 0.4p_1 + 0.15p_2 + 0.55p_3 + 0.22p_4 + 0.2p_5 + 0.08p_6 + 0.43p_7 + 0.36p_8 + 0.7p_9 \tag{9}$$

This equation can be solved as part of a system of linear equations along with the equations obtained at other rotational positions (S908). These equations can be expressed in matrix form as shown in equation (10) below wherein dots (.) represent the coefficients in front of pixels $p_1$-$p_9$ for the other positions of the disk 804 and $m_1$-$m_9$ represent the corresponding measured signal for each position. As will be appreciated by one of skill in the art, the rows of the matrix are preferably independent of each other, so that the system of linear equations can be solved.

The 9×9 matrix in equation (10) is the measurement matrix mentioned previously. For an image with n pixels, the measurement matrix will have dimensions of n×n.

$$\begin{bmatrix} 0.4 & 0.15 & 0.55 & 0.22 & 0.2 & 0.08 & 0.43 & 0.36 & 0.7 \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \\ \ldots & \ldots & \ldots & \ldots & \ldots & \ldots & \ldots & \ldots & \ldots \end{bmatrix} \times \begin{bmatrix} p_1 \\ p_2 \\ p_3 \\ p_4 \\ p_5 \\ p_6 \\ p_7 \\ p_8 \\ p_9 \end{bmatrix} = \tag{10}$$

$$\begin{bmatrix} m_1 \\ m_2 \\ m_3 \\ m_4 \\ m_5 \\ m_6 \\ m_7 \\ m_8 \\ m_9 \end{bmatrix}$$

The matrix equation can be solved for values $p_1$-$p_9$ as shown in equation (11) below:

$$\begin{bmatrix} p_1 \\ p_2 \\ p_3 \\ p_4 \\ p_5 \\ p_6 \\ p_7 \\ p_8 \\ p_9 \end{bmatrix} = \begin{bmatrix} 0.4 & 0.15 & 0.55 & 0.22 & 0.2 & 0.08 & 0.43 & 0.36 & 0.7 \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \end{bmatrix}^{-1} \times \begin{bmatrix} m_1 \\ m_2 \\ m_3 \\ m_4 \\ m_5 \\ m_6 \\ m_7 \\ m_8 \\ m_9 \end{bmatrix} \qquad (11)$$

The values $p_1$-$p_9$ can be used to generate a multi-pixel image (S910). For example, values $p_1$-$p_9$ can be mapped to grayscale values to produce a grayscale image. Alternatively, values $p_1$-$p_9$ can be mapped to black or white to produce a black-and-white image.

The image can then be processed (S912), stored (S914), displayed (S916), and/or printed (S918) as discussed herein.

As will be appreciated by one of skill in the art, the systems and methods described herein can be scaled to produce images larger than the examples described herein. For example, to produce a 100×100 pixel image, 10,000 measurements are obtained (corresponding to 10,000 distinct modulation patterns). These measurements can be obtained by taking a measurement every 0.036° (360°/10000).

Additional Imaging Systems

In some embodiments of the invention, an imaging system (e.g., the imaging system described in the context of FIG. 3A herein) is configured to prevent radiation reflected by the object of interest 306 from directly entering receiver 314. A variety of approaches can be utilized to achieve this goal.

In one embodiment, the receiver 314 includes a highly-directive antenna directed toward the imaging window on the spatially selective mirror so that energy received directly from the object of interest 306 is severely attenuated.

Figure 3B:
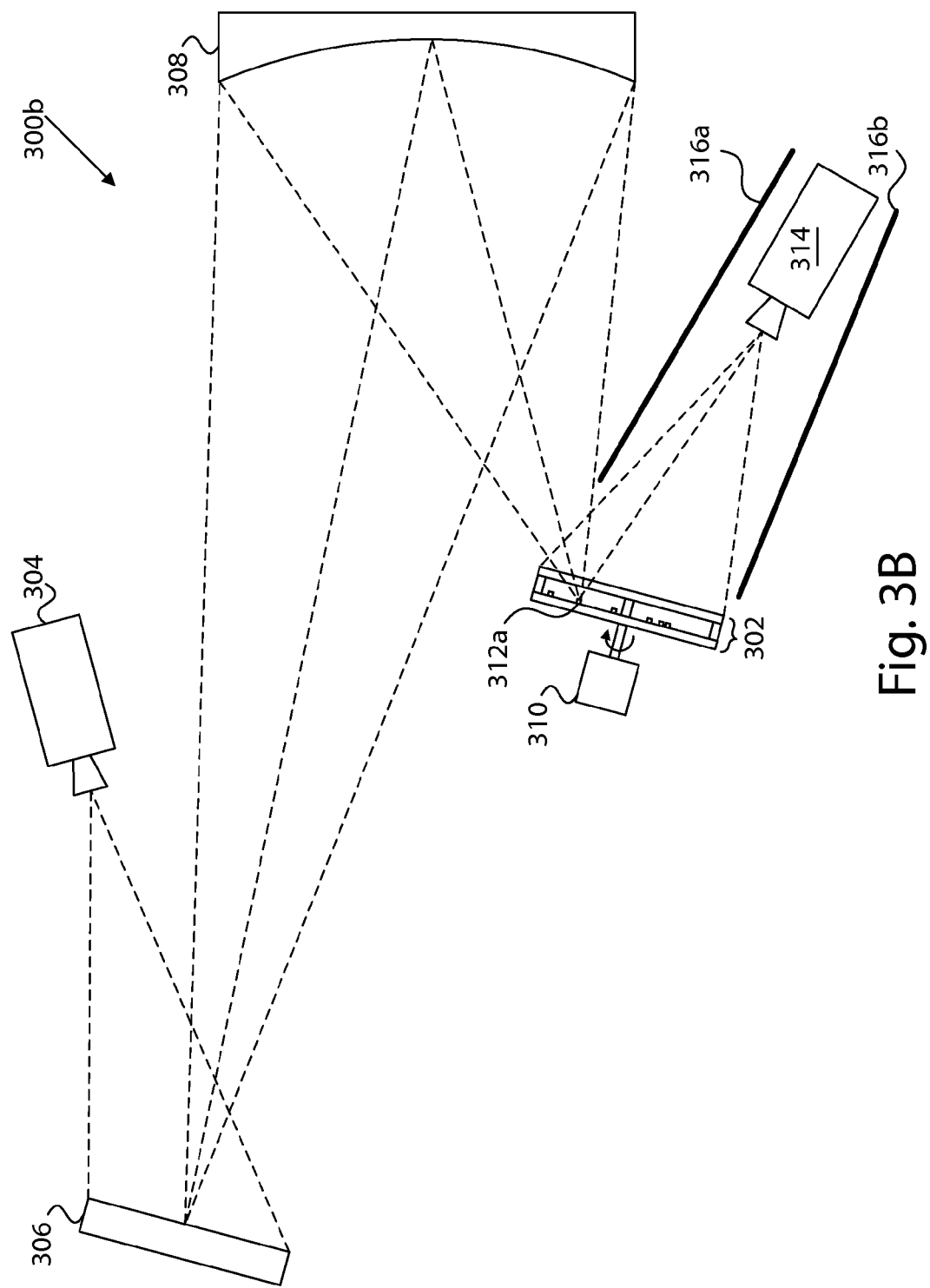
FIG. 3B depicts an imaging system incorporating a spatially-selective reflective structure and radar absorbing material according to one embodiment of the invention.

In another embodiment depicted in FIG. 3B, a blocking mask of radar-absorbing material (RAM) 316 can be placed around the receiver 314 to prevent external radiation from reaching the receiver 314.

Figure 3C:
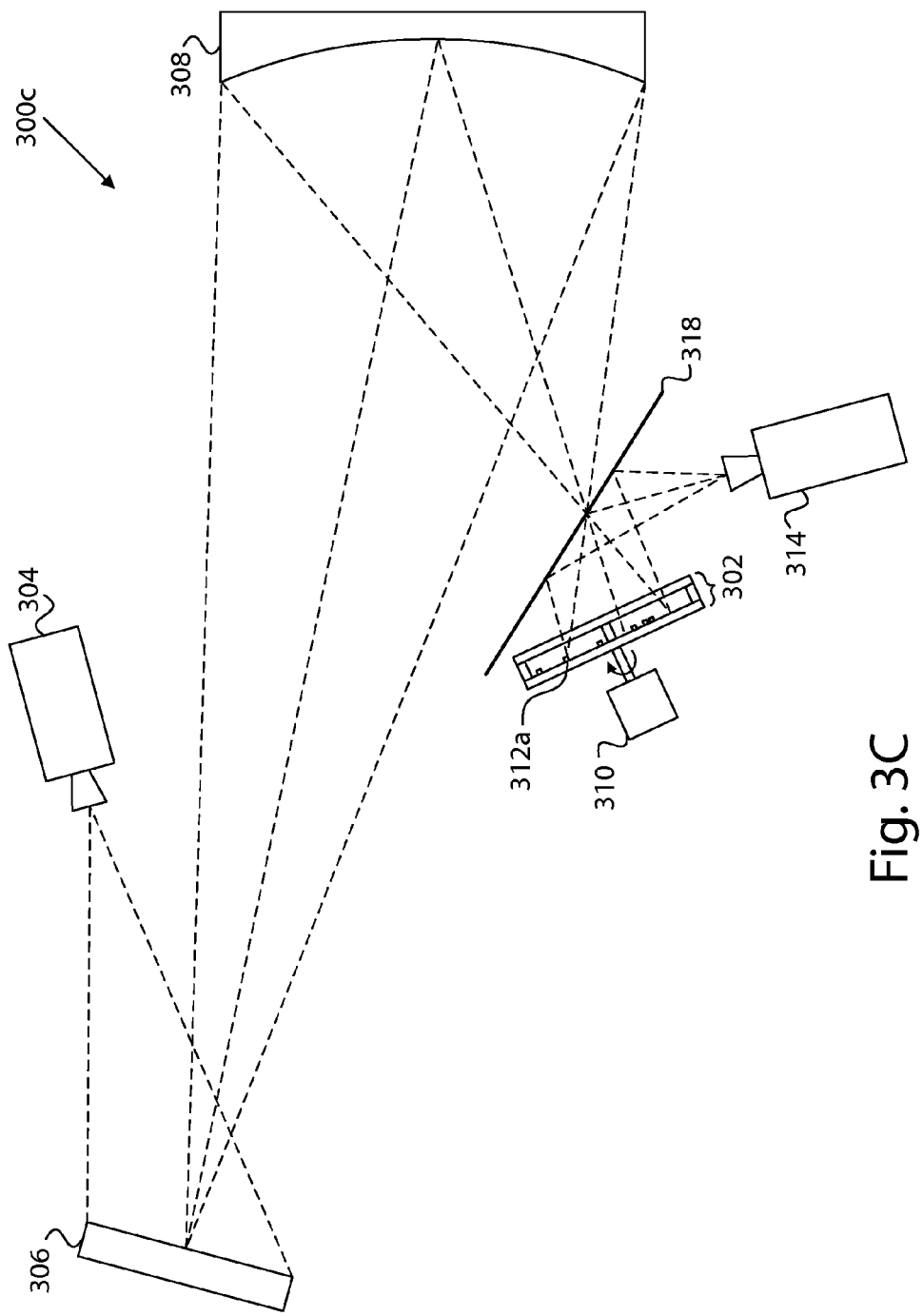
FIG. 3C depicts an imaging system incorporating a spatially-selective reflective structure and a beam splitter according to one embodiment of the invention.

In still another embodiment depicted in FIG. 3C, a beam splitter 318 allows for the positioning of receiver 314 away from the likely path of ambient energy reflected by object of interest 306.

Figure 3D:
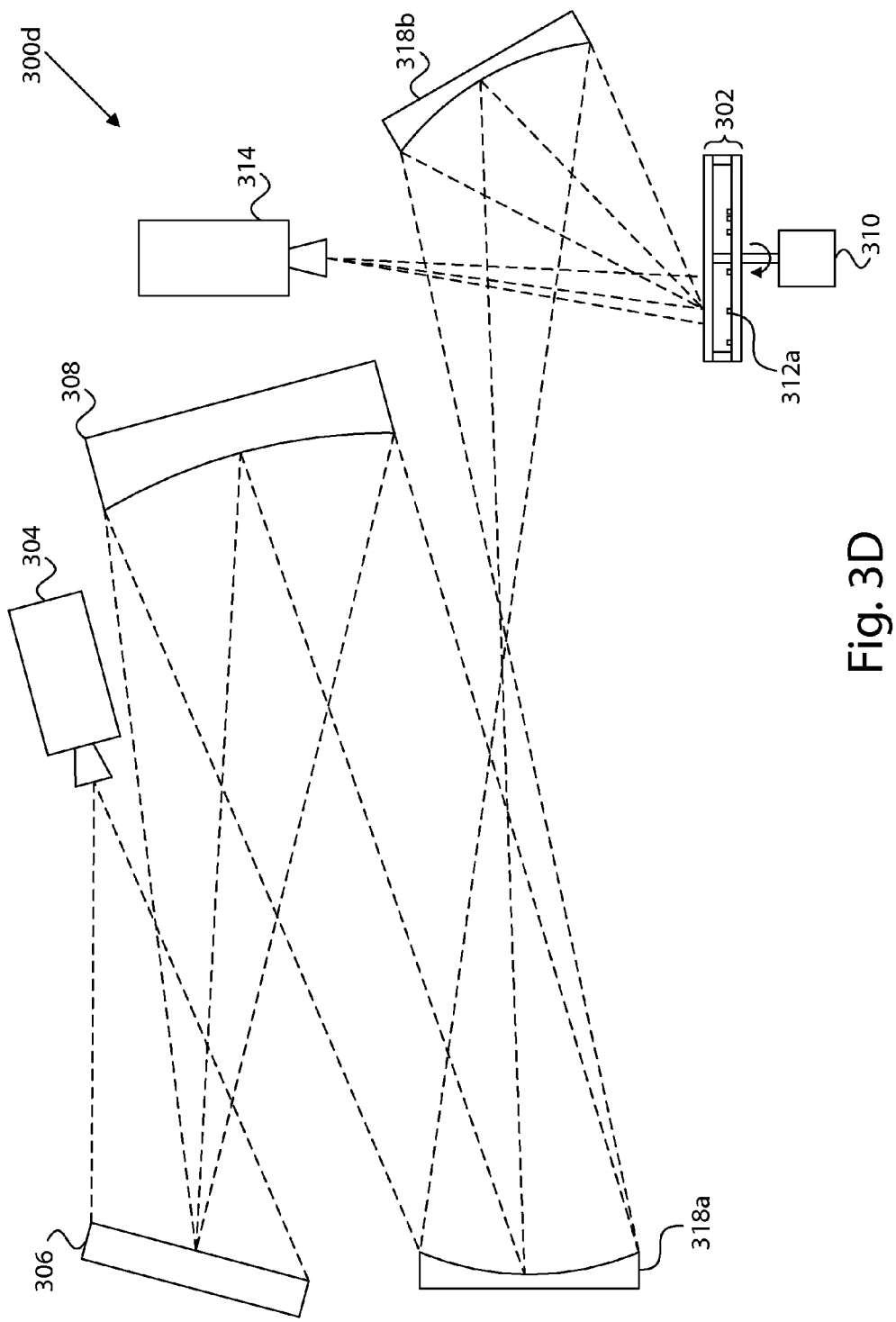
FIG. 3D depicts an imaging system incorporating a spatially-selective reflective structure and secondary optics according to one embodiment of the invention.

In some embodiments, the imaging system is designed for "standoff" detection, for example, from a distance of about 5 to 50 meters from an object of interest. However, embodiments of the invention herein can be configured to scan objects of interest at ranges of less than 5 meters or greater than 50 meters from an object of interest. For example, as depicted in FIG. 3D, an imaging system can include one or more secondary optics 318a, 318b (e.g., optics having aplanatic surfaces). The secondary optics 318 can be movable in order to focus the imaging system 300d.

Optimization of Partially-Conducting Slabs

Figure 10:
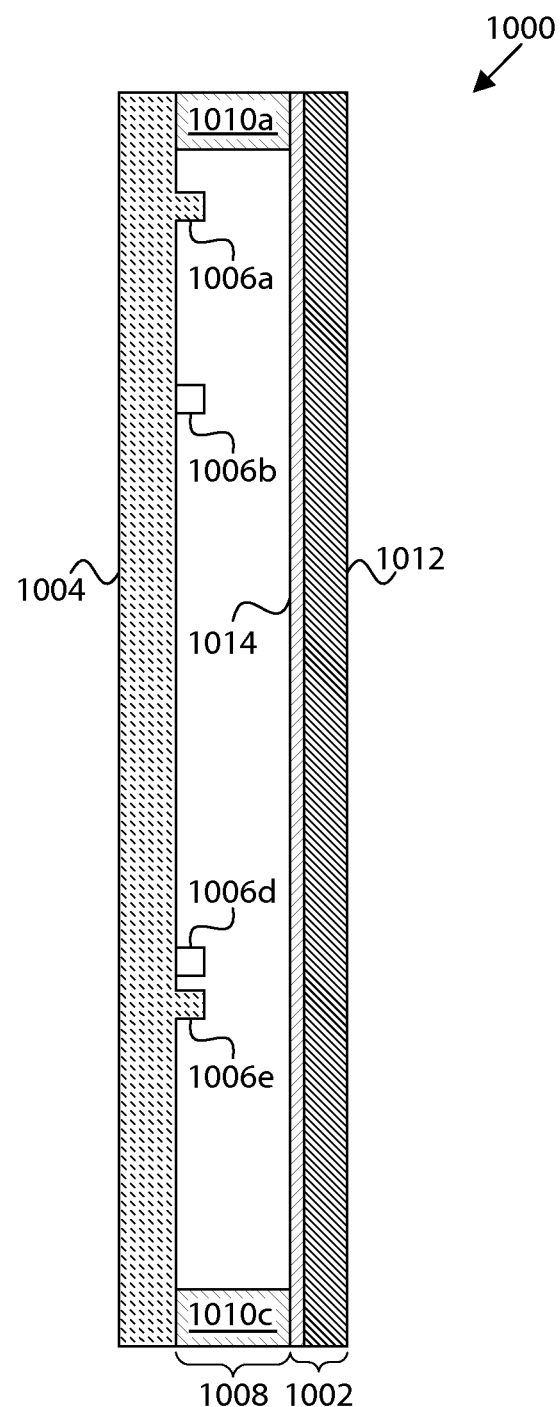
FIG. 10 depicts a partially-conducting slab including a non-conductive material coated with a thin metallic film according to one embodiment of the invention.

As discussed herein and depicted in FIG. 10, in some embodiments, partially-conducting slab 1002 can be a non-conductive material 1012 coated with a thin metallic film 1014. This embodiment of the partially-conducting slab 1002 is also referred to herein as a "resistive sheet."

Figure 11A:
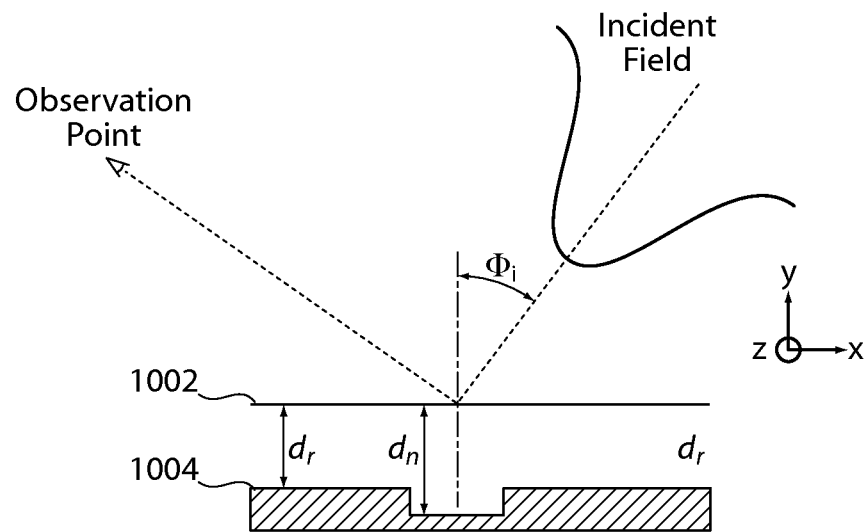
FIGS. 11A-11C depict schematics for reflective structures having depressions, bumps, and no modulations, respectively, according to various embodiments of the invention.
Figure 11B:
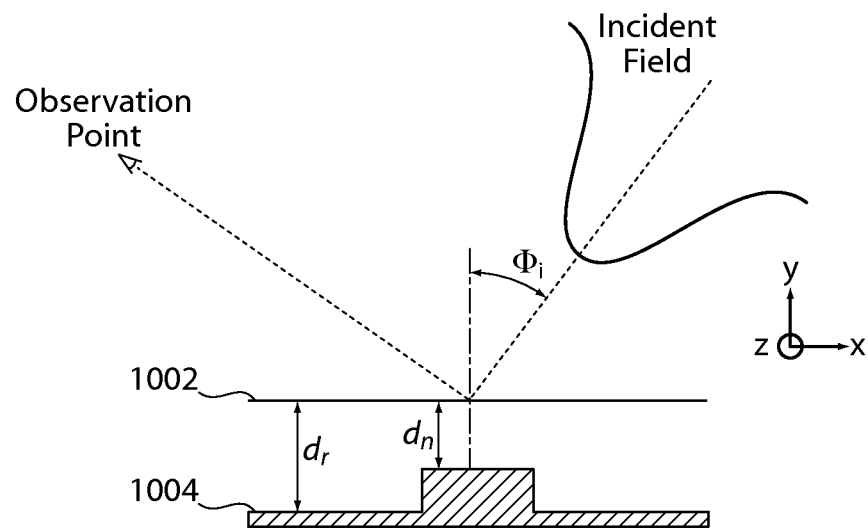
Figure 11C:
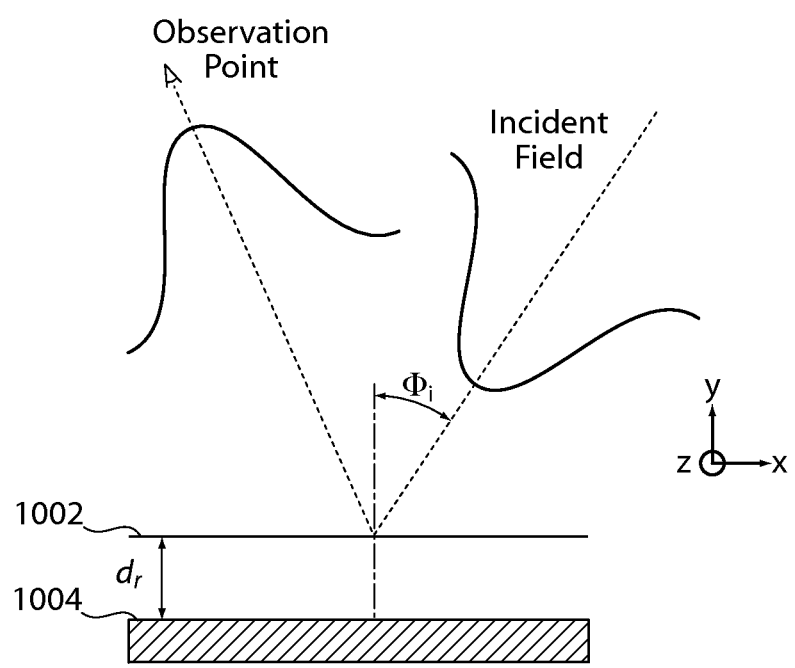

The optimal parameters for the distance of the modulations and the resistive sheet 1002 can be expressed by the formula in the context of FIGS. 11A-11C:

$$d_n = n \frac{\lambda}{2\sqrt{\varepsilon_r}\cos(\phi_i)}, \qquad (12)$$

$$n = 1, 2, \ldots$$

where $\varepsilon_r$ is the relative permittivity of the media between the thin metallic layer 1014 and the modulation 1006, $\lambda$ is the wavelength of interest, and $\phi_i$ is the angle of radiation incidence given with respect to the normal of the spatially-selective minor 1000.

Similarly, the optimal distance for absorption (i.e., the distance between the metallic layer 1014 and the area of reflector disk 1004 without a modulation 1006) can be expressed by the formula:

$$d_r = \frac{(2n-1)\lambda}{4\sqrt{\varepsilon_r}\cos(\phi_i)}, \qquad (13)$$

$$n = 1, 2, \ldots$$

The optimal value of the resistivity depends on the angle of incidence $\phi_i$. FIGS. 12A-12I depict the results of a method of moments analysis to calculation the reflectivity of a structure similar to the structure depicted in FIG. 11C.

Figure 12A:
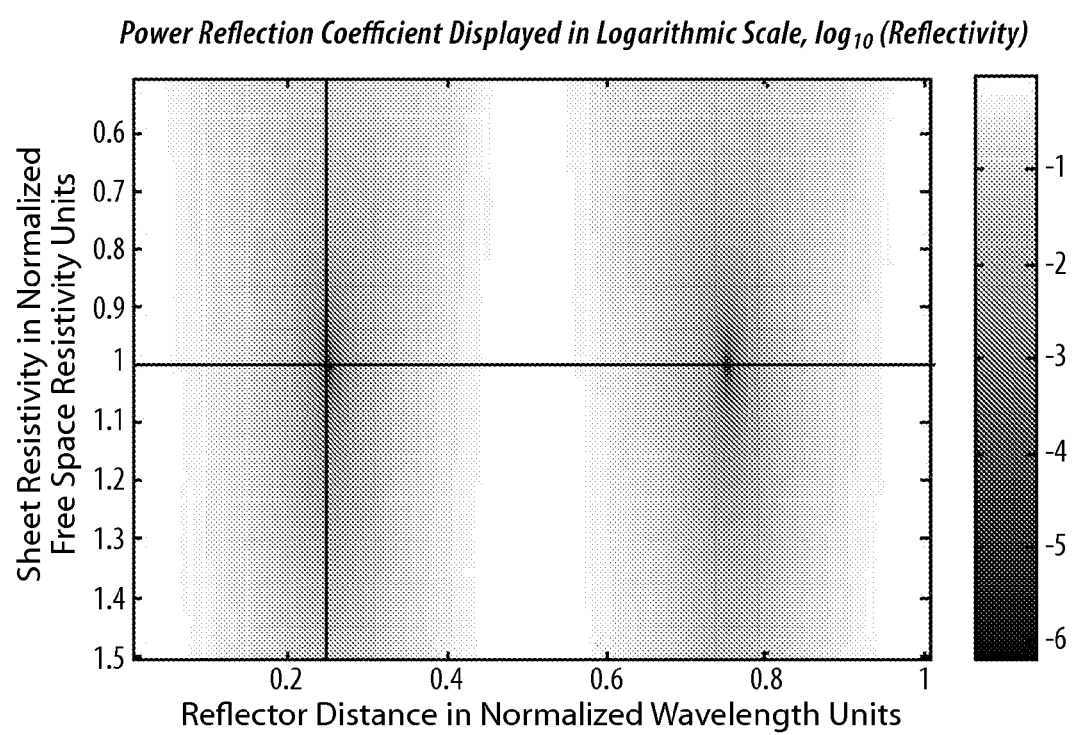
FIGS. 12A-12I depict the power reflectivity coefficient as function of reflector distance and/or sheet resistance for various radiation incidence angles according to various embodiments of the invention.
Figure 12B:
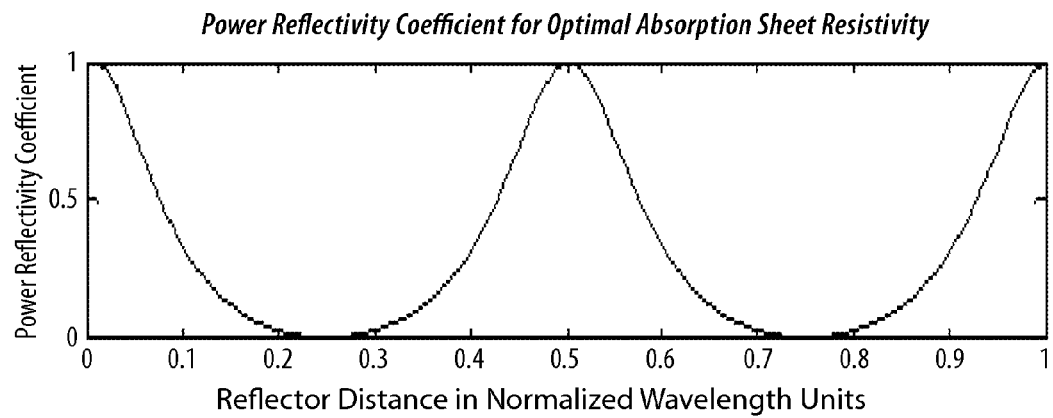
Figure 12C:
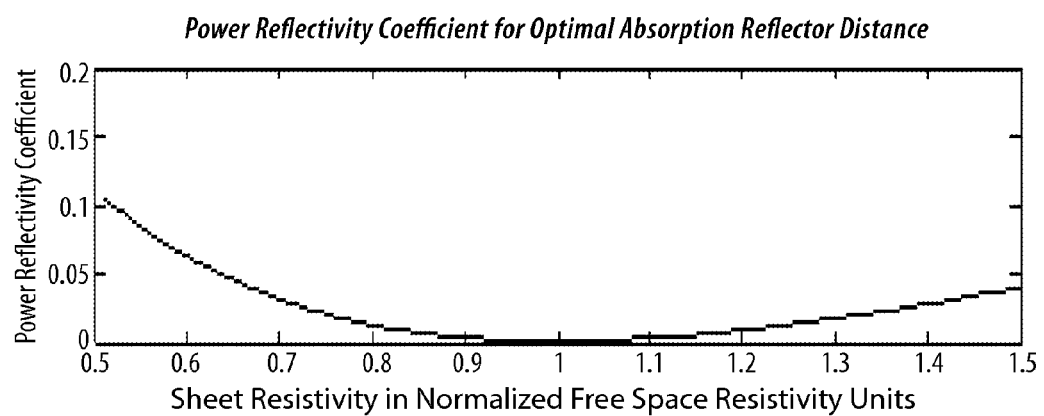

FIGS. 12A-12C depict the power reflectivity coefficient as a function of reflector distance and/or sheet resistivity for radiation normally incident to the structure. FIG. 12A depicts the $\log_{10}$ of the reflectivity as a function of reflector distance (x-axis) and the sheet resistivity (y-axis). FIGS. 12B and 12C depict slices through the lines in FIG. 12A, but are displayed linearly (i.e., not in $\log_{10}$).

Figure 12D:
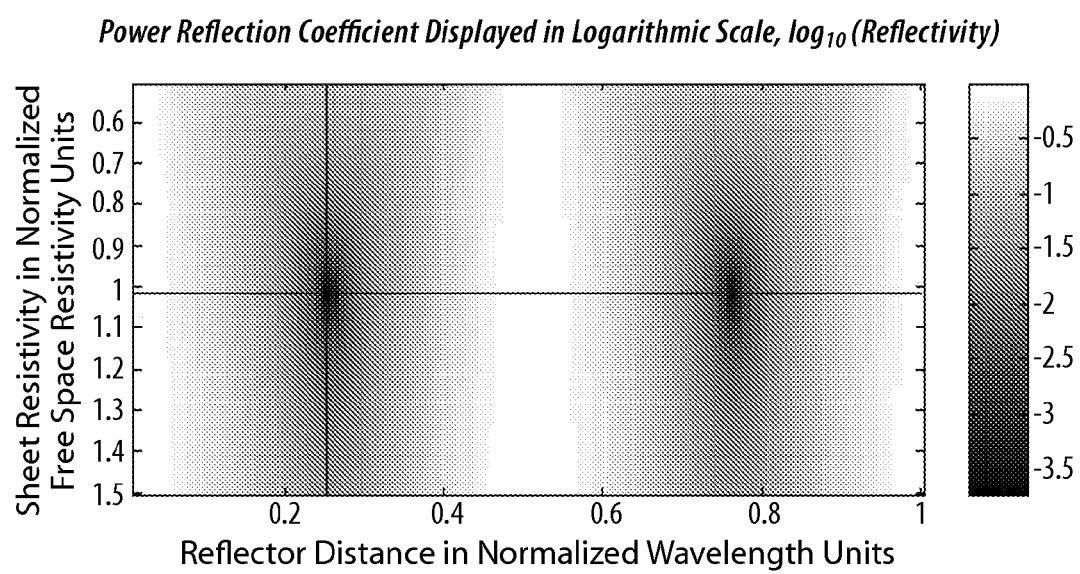
Figure 12E:
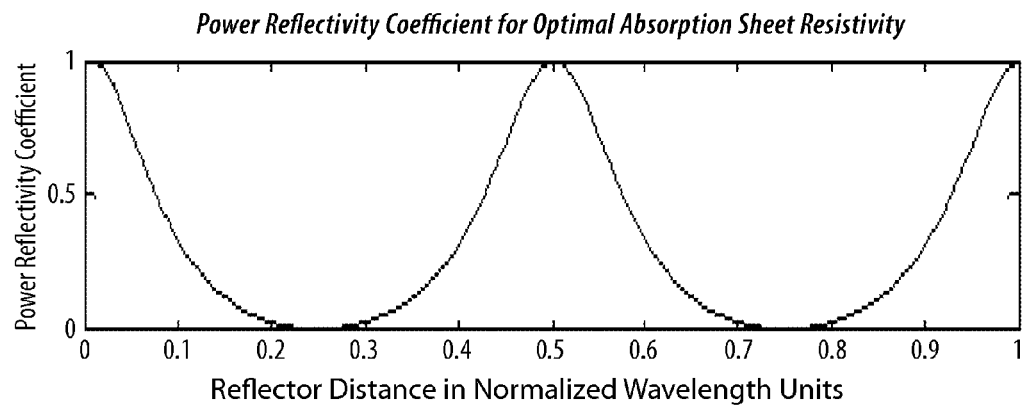
Figure 12F:
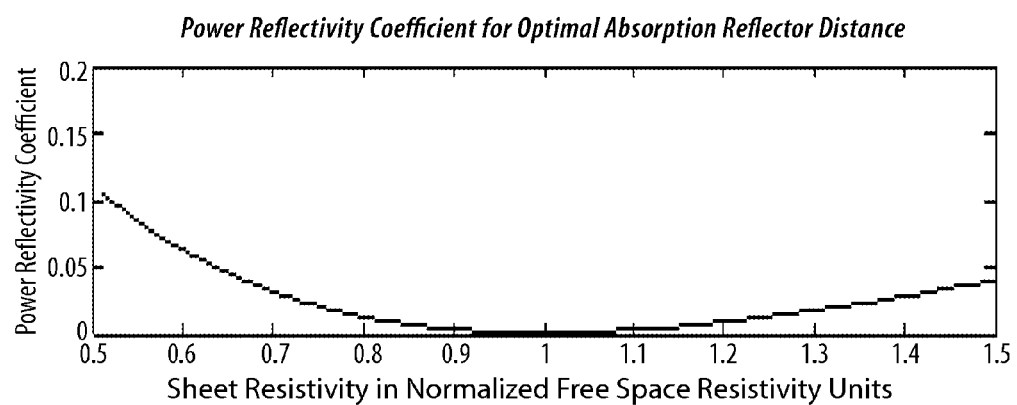

FIGS. 12D-12F depict the power reflectivity coefficient as a function of reflector distance and/or sheet resistivity for radiation incident to the structure at 10° off the normal. FIG. 12D depicts the $\log_{10}$ of the reflectivity as a function of reflector distance (x-axis) and the sheet resistivity (y-axis).

FIGS. 12E and 12F depict slices through the lines in FIG. 12D, but are displayed linearly (i.e., not in $\log_{10}$).

Figure 12G:
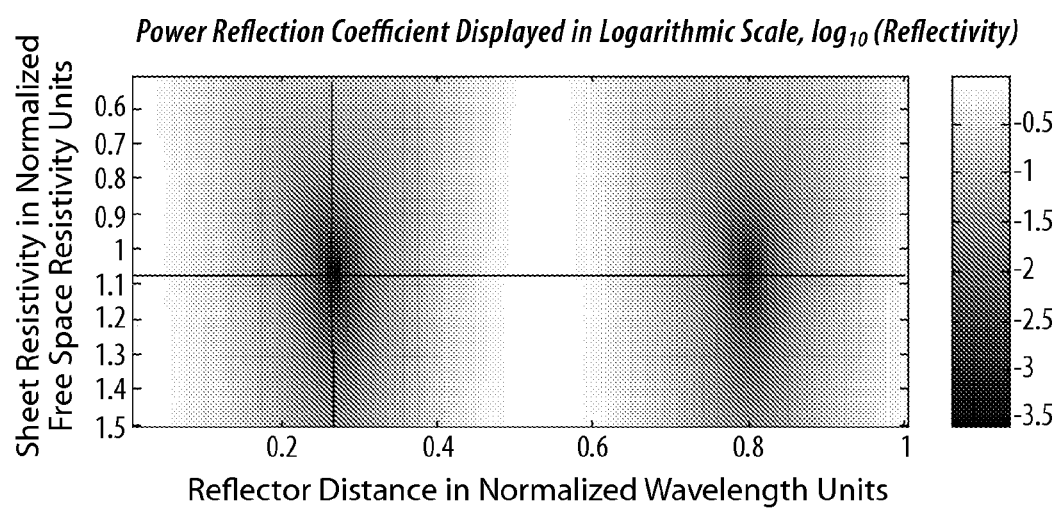
Figure 12H:
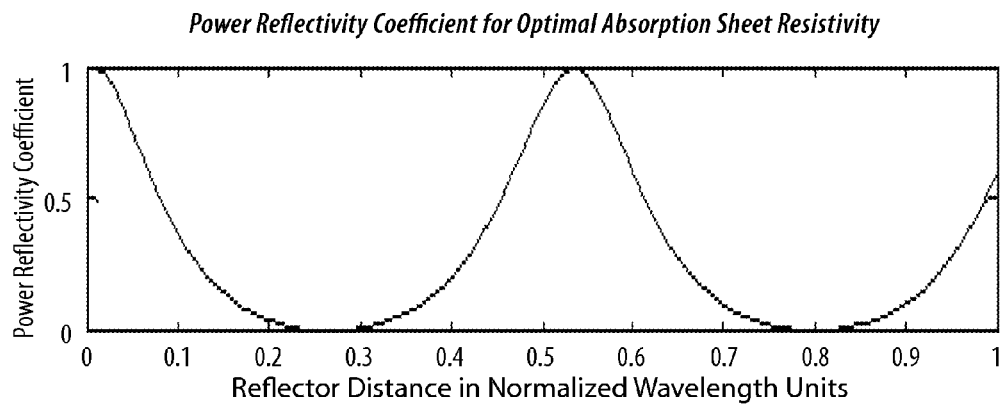
Figure 12I:
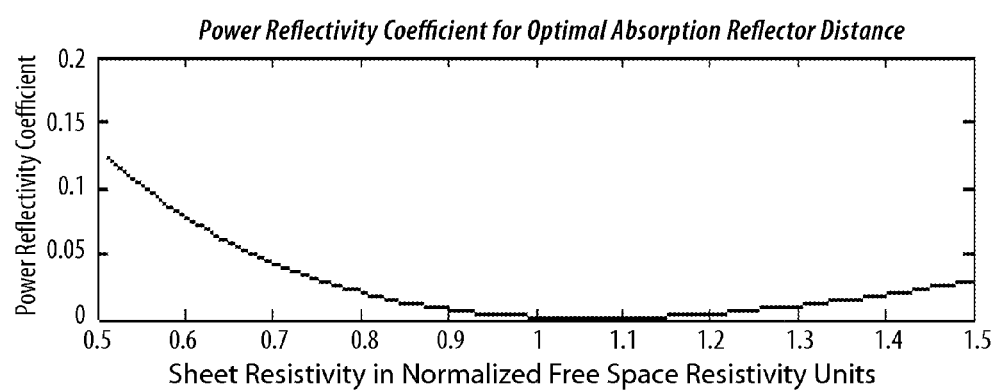

FIGS. 12G-12I depict the power reflectivity coefficient as a function of reflector distance and/or sheet resistivity for radiation incident to the structure at 20° off the normal. FIG. 12G depicts the $\log_{10}$ of the reflectivity as a function of reflector distance (x-axis) and the sheet resistivity (y-axis). FIGS. 12H and 12I depict slices through the lines in FIG. 12G, but are displayed linearly (i.e., not in $\log_{10}$).

As depicted in FIGS. 12A-12I, the optimal parameters change with the angle of incidence. The distance parameters as a function of radiation incidence angle are given by equations (12) and (13) and sheet resistivity can be maintained at approximately that of free space (i.e., about 377Ω/□) for angles of incidence less than about 20°.

Additionally, as depicted in FIGS. 12A-12I, the dynamic range of the reflector (minimum to maximum reflectivity range) is larger if the radiation is normally incident on the structure. In this regard, embodiments of the imaging systems including a beam splitter 318 such as depicted in FIG. 3C may be preferred in certain situations over the configuration depicted in FIG. 3A.

As discussed herein, depressions can be preferred over modulations in some embodiments of the invention. In general, spatially-selective reflector structures having depressions perform better, particularly when the gap between the thin metallic film and the absorbing portion of the reflector disk is minimized.

In some embodiments, the linear dimension (i.e., width or diameter) of the modulation is at least three wavelengths of interest. Increasing the dimension of the non-uniformity can increase the level of the reflected signal. However, if the modulation scheme of the spatially selective minor is raster scanning, increasing the dimension of the non-uniformity can increase the blur in the detected image. Accordingly, in some embodiments, the proper linear dimension for the non-uniformity in this case is greater than three wavelengths and less than λF#, where F# is the F-number of the optics of the system and λ is the radiation wavelength of interest.

Figure 13A:
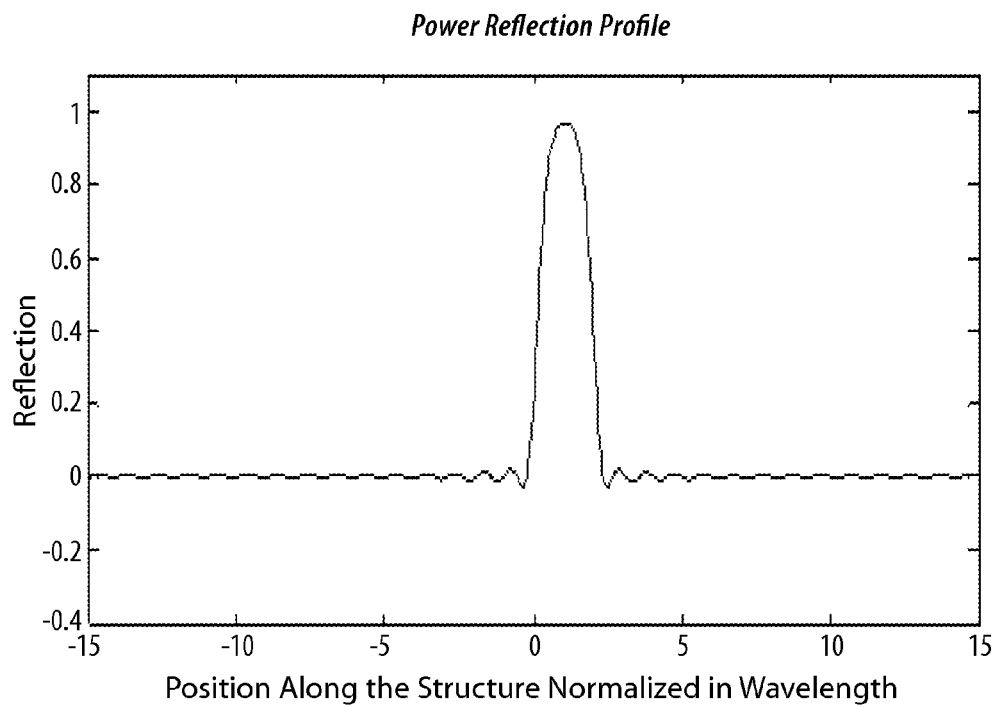
FIGS. 13A and 13B depict the power reflection profile of a spatially-selective reflective structure having a depression of linear dimensions 2λ and 3λ, respectively, for a reflective structure wherein the depression distance and reflector distance from the resistive sheet are $$\frac{\lambda}{2} \text{ and } \frac{\lambda}{4},$$
Figure 13B:
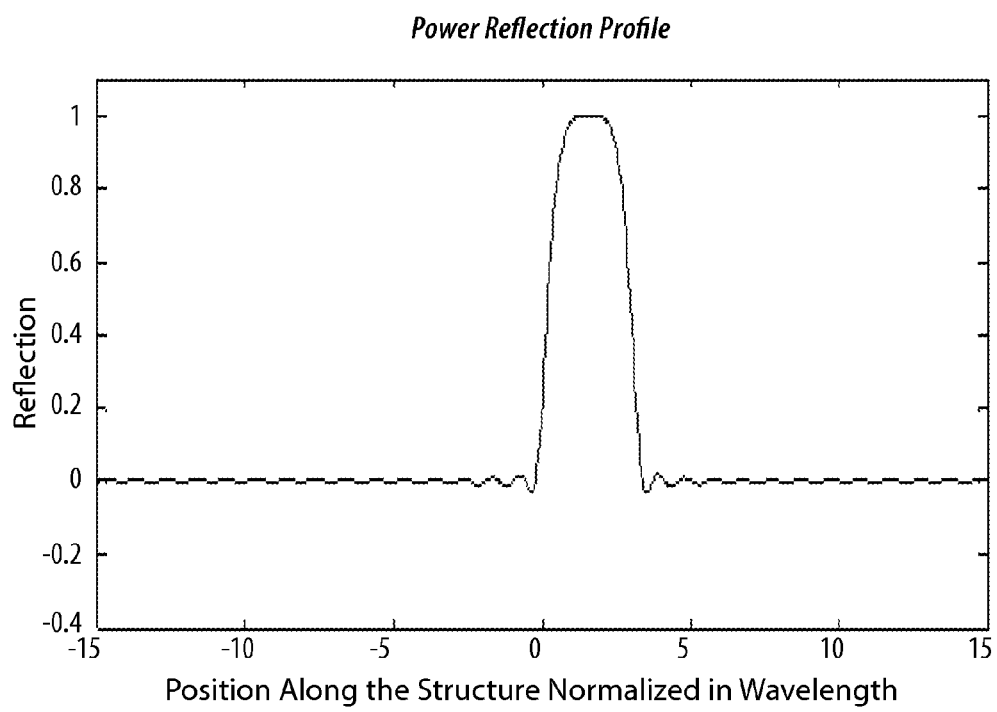

FIGS. 13A and 13B depict the power reflection profile of a spatially-selective reflective structure having a depression of linear dimensions 2λ and 3λ, respectively, for a reflective structure wherein the depression distance and reflector distance from the resistive sheet are $$\frac{\lambda}{2}$$
and
$$\frac{\lambda}{4},$$

respectively, the sheet resistivity is 377Ω/□, and the radiation is normally incident to the structure. As depicted by the plots in FIGS. 13A and 13B, the reflection profile of the 3λ depression (i.e., FIG. 13B) is more effective than the 2λ depression (i.e., FIG. 13A). The maximum value of the reflection coefficient was 1 for the 3λ depression and about 0.97 for the 2λ depression. Furthermore, the reflection profile for the 3λ depression was more defined than that of the 2λ depression, i.e., the reflection profile have a wider constant reflection profile.

FIGS. 14A and 14B depict the power reflection profile of a spatially-selective reflective structure having a bump distance and reflector distance of $$\frac{\lambda}{2}$$
and
$$\frac{3\lambda}{4},$$

respectively, a sheet resistivity of 377Ω/□, and radiation normally incident to the structure.

As depicted in FIGS. 13A-14B, portions of the reflection profiles oscillate around zero. Negative values exists because the reflection coefficient is calculated by subtracting the absorption coefficient (i.e., the physical quantity that is calculated from the currents on the resistive sheet) from 1. These oscillations are caused by diffraction of the electric field by the edges of the non-uniformities and become more evident as the distance between the reflector and the resistive sheet increases or if the modulations are bumps. These diffracted fields interfere with the fields that are incident on the resistive sheet and the fields that are reflected from the reflector to cause the undulations depicted in FIGS. 13A-14B.

FIG. 15 depicts the power reflection coefficient for a structure that is modulated by two depressions separated by a gap that varies from 0.1λ to 10λ. The depression distance and reflector distance from the resistive sheet were $$\frac{\lambda}{2}$$
and
$$\frac{\lambda}{4},$$

respectively; the sheet resistivity was 377Ω/□; and the radiation was normally incident to the structure.

Each column of the plot is one reflectivity profile corresponding to a separation as indicated on the x-axis. The plot shows that when the distance between the depressions (i.e., the separation distance as depicted on the x-axis of FIG. 15) is greater than 5λ and every subsequent multiple of a wavelength, the undulations in the region between depressions are minimized. Also, the undulations on the outsides of the depressions are minimized when the separation is an odd multiple of the wavelength that is greater than or equal to 5λ (e.g., 5λ, 7λ, 9λ, and so on). Furthermore, the undulations almost disappear when the distance between the depressions is greater than 10λ.

Inter-modulation distances need not be a multiple of the wavelength of interest. For example, undulations are acceptably low when the inter-modulation distance is a non-event multiple of a wavelength (e.g., 3.6λ, 4.4λ, 6.7λ, and so on).

FIGS. 16A, 16B, 16C, and 16D depict slices of FIG. 15 and provide reflectivity profiles for separations of 4λ, 4.5λ, 5λ, and 10λ, respectively.

Accordingly, in some embodiments of the invention, modulations are separated by a multiple of a wavelength of interest λ. For example modulations can be separated by about 1λ, about 2λ, about 3λ, about 4λ, about 5λ, about 6λ, about 7λ, about 8λ, about 9λ, about 10λ, about 11λ, about 12λ, about 13λ, about 14λ, about 15λ, about 16λ, about 17λ, and the like.

As will be appreciated by one of ordinary skill in the art, absorption profiles can be generated for any potential reflective structure using existing software programs. Such modeling can be desirable both to calculate the matrices discussed herein as well as to optimize the performance of the reflective structure.

Reflector Disks and Methods of Fabricating the Same

Referring now to FIG. 17 in the context of FIG. 18, a method 1700 of fabricating a reflector disk is provided.

In step S1702, a metallic disk 1802 is provided. As discussed herein, the metallic disk 1802 can, in some embodiments, be fabricated from a highly-conductive metal such as copper, silver, aluminum, and the like.

In step S1704, one or more modulations 1804 (e.g., bumps or depressions) are formed in the metallic disk 1802. Modulations 1804 can be formed with a variety of techniques including machining, etching, and the like. Alternatively, a metallic disk 1802 can be cast or molded with modulations 1804. Modulations 1804 can, in some embodiments, be dimensioned according to the principles and equations discussed herein.

In step S1706, a dielectric layer 1806 is applied to the metallic disk 1802. The dielectric layer 1806 is preferably transparent to the frequency of interest. Suitable dielectric materials include, for example, polyethylene terephthalate (PET) (available under the MYLAR® trademark from E. I. Du Pont de Nemours and Company of Wilmington, Del.) and the like.

In step S1708, the dielectric material 1806 can be machined to produce a uniform thickness. In some embodiments, the dielectric material has a thickness as discussed herein.

In step S1710, a metallic film 1808 can be deposited on the dielectric material 1806 as discussed herein. The metallic film 1808 can be a metal, for example a highly-conductive metal such as aluminum, copper, silver, gold, and the like. The thickness of the metallic film 1808 can, in some embodiments, be such that the resistivity of the film 1808 is equal to that of free space (i.e., approximately 377Ω/□).

Motors and Viewing Windows

Referring now to FIG. 19A, a spatially-selective reflector device and motor assembly 1900a is provided. A motor 1910 spins a spatially-selective reflector structure 1902a (e.g., a spatially-selective reflector structure as described herein) behind a shield 1904a defining a viewing window 1906a. In some embodiments, the shield 1904a is coated with or fabricated from an absorptive material such as ECCOSORB® materials (available from Emerson & Cuming of Randolph, Mass.) and radar absorbent materials (RAM).

Structure 1902a can be rotated continuously and at a constant speed by a spindle motor such as those used in hard disk drives. If the structure 1902a is rotated at a constant speed, the measurement precision is limited only by the integration time of the receiver and the noise level of the receiver system. For example, the bandwidth of the receiver increases as the rate of data acquisition increases but an increase in receiver bandwidth increases the received noise. For an imager of 100 by 100 pixels that forms 30 frames per second, 300,000 measurements are required (corresponding to a receiver bandwidth of 300 KHz).

If the structure 1902a is rotated at a constant speed, the receiver can be triggered to start sampling the input by a sensor that detects the start of one revolution. This removes the need to have an encoder that can measure $\frac{1}{10,000}^{th}$ of a rotation. If the receiver samples 10,000 samples per revolution triggered by the revolution sensor then each signal sample corresponds to $\frac{1}{10,000}^{th}$ of a rotation and each measurement is automatically registered with a rotational position.

In some embodiments, the diameter of the structure 1902a is between about 2.5 to about 3 times the linear vertical dimension of the imaging window 1906a.

The size of the imaging window 1906a can be a function of the desired resolution. For example, to produce an image of 100×100 pixel, wherein each pixel has a 1 mm×1 mm dimension, the imaging window 1906a will be about 10 cm×10 cm. The structure 1902a can have a diameter between about 25 cm and about 30 cm. If the pixel linear size is decreased or increased by a ratio R while the number of pixels is held constant, the diameter of structure 1902a will decrease or increase by the same ratio R.

In some situations, the multi-modulation embodiments of the devices herein may be preferred over a raster scanning embodiments (i.e., embodiments where a single modulation is within the imaging window 1806 at any given time) because (i) the signal received by the receiver is higher (thereby increasing the signal to noise ratio) and (ii) a smaller structure can be utilized. However, in situations in which computing power is limited, a raster scanning embodiment may be preferred.

Without being bound by theory, experimentation has shown that at any give time, about 20% to about 30% of the imaging window can be "covered" by modulations. This percentage can extend beyond this range so long as the conditions discussed herein are satisfied.

As depicted in FIG. 19B, a spatially-selective reflector device and motor assembly 1900b can be provided for a raster scanning embodiment. Instead of a "large" imaging window 1906a as in the multiple-modulation assembly 1900a, shield 1904b includes an imaging window encompassing a single modulation. Shield 1904b can be moved with respect the diameter of structure 1902b to generate a 2D image from reflections captured from other modulations (not depicted in FIG. 19B). In other embodiments, structure 1902b has a single modulation and a 1D image is generated.

Calculation of Measurement Matrix

Referring to FIG. 20, the measurement matrix described herein can be calculated according to method 2000.

In step S2002, the imaging window is divided into a desired number of pixels.

In step S2004, for a first rotational position of the structure, the centers of modulations visible through the imaging window are calculated.

In step S2006, the area of intercept between the pixel and a modulation is calculated. In some embodiments, the area of intercept can be calculated using a Monte Carlo algorithm or other similar method. For example, if an arbitrary number of points are randomly chosen within each pixel each point will contribute the local reflection coefficient for that point (e.g. 1.0, 0.5, and the like) to the integration.

In step S2008, a row of the measure matrix is formed based on the area of intercept calculated as discussed herein for each pixel in step S2006.

In step S2010, steps S2004-S2008 are repeated for each subsequent pattern of non-uniformities.

As discussed herein, method 2000 need to only be performed once for a given disk and a given pixel division in an imaging window. Therefore, it can be computed to the highest accuracy possible using all available time and computing resources. As discussed herein, it may be preferable in some embodiments to perform a three-dimensional electromagnetic analysis of the entire structure to determine accurately the absorption/reflection profile of the disk so that the measurement matrix is calculated accurately.

Once the measurement matrix is computed, its inverse is computed. Again, this operation only needs to be done once.

The system of linear equations can be solved simply by multiplying the inverse of the measurement matrix by the measurement data. This calculation can be performed by hardware and/or software capable of multiplying a matrix and a vector. For example, this multiplication can be performed by one or more field programmable gate arrays (FPGAs) available from Altera Corporation of San Jose, Calif.

Scanning Applications

As discussed herein, embodiments of the invention can be utilized for standoff scanning (e.g., at large gatherings such as sporting events, parades, rallies, and the like.)

Other embodiments of the invention can be utilized for profiling sensors that scan a single line of a moving object and form an image in time. Such an embodiment can be deployed in environment such as airports, office buildings, and the like where individuals are asked to move through portal. Advantageously, profiling scanners only require the imaging of a single line at any given moment. (The lines are then combined to form an image.) Thus, the reflector size and computation power for image acquisition can be minimized. Both multiple-modulation and raster scanning embodiments described herein can be used in profiling scanners.

Referring now to FIG. 21, a profiling scanner 2100 incorporating the imaging devices described herein is provided. An individual 2102 enters the scanner 2100 at a proximal end 2104 and exits at a distal end 2106. The individual can move through the scanner 2100 by walking or can stand on an optional moving walkway 2108. As the individual moves through the scanner 2100, one or more imaging devices 2110a, 2110b images a plurality of lines (e.g., substantially horizontal lines) of the individual's body.

In some embodiments one or more optics 2112a, 2112b are used to focus the imager. For example, the optics can 2112a, 2112b can focus on the floor of the distal end 2106 and proximal end 2104, respectively. As the individual 2102 moves through the scanner, the individuals entire body will be imaged without the need to adjust the optics 2112.

EQUIVALENTS

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) shown as distinct for purposes of illustration may be incorporated within other functional elements, separated in different hardware, or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

INCORPORATION BY REFERENCE

The entire contents of all patents, published patent applications, and other references cited herein are hereby expressly incorporated herein in their entireties by reference.

The invention claimed is:

1. A spatially-selective reflective structure comprising:
a partially-conducting slab; and
a modulating reflector disk adjacent to the partially-conducting slab, the modulating reflector disk having one or more modulations;
wherein:
the distance between the modulations of the modulating reflector disk and the partially-conducting slab is defined by the formula $$d_n = n \frac{\lambda}{2\sqrt{\varepsilon_r}\cos(\phi_i)},$$

n=1, 2, . . . ; or
the distance between a non-modulated surface of the modulating reflector disk and the partially-conducting slab is defined by the formula $$d_r = \frac{(2n-1)\lambda}{4\sqrt{\varepsilon_r}\cos(\phi_i)}, n = 1, 2, \ldots \text{ ; and}$$

$\varepsilon_r$ is the relative permittivity of the media between the partially-conducting slab and the modulations, $\lambda$ is the wavelength of interest, and $\phi_i$ is the angle of radiation incidence given with respect to a normal of the spatially-selective reflective structure.

2. The spatially-selective reflective structure of claim 1, wherein the one or more modulations is a single modulation.

3. The spatially-selective reflective structure of claim 1, wherein the one or more modulations is a plurality of modulations.

4. The spatially-selective reflective structure of claim 3, wherein the plurality of modulations are arranged in a spiral pattern.

5. The spatially-selective reflective structure of claim 3, wherein the plurality of modulations are arranged randomly.

6. The spatially-selective reflective structure of claim 1, wherein the plurality of modulations are arranged such that a matrix having a plurality rows, each with elements corresponding to a fraction of each pixel in a viewing window projected onto the disk that is backed by a modulation at a distinct rotational position of the disk, has linearly independent rows.

7. The spatially-selective reflective structure of claim 1, wherein the plurality of modulations are separated by a multiple of a wavelength of interest.

8. The spatially-selective reflective structure of claim 7, wherein the multiple is an odd multiple.

9. The spatially-selective reflective structure of claim 7, wherein the multiple is greater than five.

10. The spatially-selective reflective structure of claim 1, wherein the one or more modulations have well-defined edges.

11. The spatially-selective reflective structure of claim 1, wherein the partially-conducting slab is a semiconductor.

12. The spatially-selective reflective structure of claim 1, wherein the partially-conducting slab is a dielectric doped with conductive particles.

13. The spatially-selective reflective structure of claim 1, wherein the partially-conducting slab comprises:
a non-conductive plate; and
a thin metal film applied to the non-conductive plate.

14. The spatially-selective reflective structure of claim 1, wherein the modulating reflector disk comprises a highly-conductive metal.

15. The spatially-selective reflective structure of claim 1, wherein the partially-conducting slab and the modulating reflector disk are coupled with one or more mechanical fasteners.

16. The spatially-selective reflective structure of claim 1, wherein the modulating reflector disk can rotate independently of the partially-conducting slab.

17. The spatially-selective reflective structure of claim 1, wherein the partially-conducting slab and the modulating reflector disk are separated by a gap.

18. The spatially-selective reflective structure of claim 17, wherein the gap is adjustable.

19. The spatially-selective reflective structure of claim 1, wherein one or more modulations are depressions.

20. The spatially-selective reflective structure of claim 1, wherein the one or more modulations are bumps.

21. The spatially-selective reflective structure of claim 1, wherein the one or more modulations have a cross-sectional dimension greater or equal to about one wavelength of interest.

22. The spatially-selective reflective structure of claim 1, wherein the one or more modulations have a cross-sectional dimension greater or equal to three wavelengths of interest.

23. The spatially-selective reflective structure of claim 1, wherein the one or more modulations have a cross-sectional dimension less than the wavelength of interest multiplied by an F-number for an optics system directing radiation at the spatially-selective reflective structure.

* * * * *